(12) United States Patent
Honda

(10) Patent No.: US 7,868,941 B2
(45) Date of Patent: Jan. 11, 2011

(54) DATA TRANSFER APPARATUS, IMAGE CAPTURING APPARATUS, AND DATA TRANSFER SYSTEM

(75) Inventor: Hirofumi Honda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 11/937,906

(22) Filed: Nov. 9, 2007

(65) Prior Publication Data
US 2008/0136936 A1 Jun. 12, 2008

(30) Foreign Application Priority Data
Dec. 11, 2006 (JP) .............................. 2006-333869

(51) Int. Cl.
*H04N 5/225* (2006.01)
*H04N 5/232* (2006.01)
*H04N 5/222* (2006.01)

(52) U.S. Cl. .............................. 348/333.05; 348/207.1; 348/211.1

(58) Field of Classification Search .............. 348/207.1, 348/211.99–211.5, 333.05, 333.11; 725/105
See application file for complete search history.

(56) References Cited

U.S. PATENT DOCUMENTS

| | | | |
|---|---|---|---|
| 6,538,698 B1 * | 3/2003 | Anderson | 348/333.05 |
| 6,701,058 B1 * | 3/2004 | Tsubaki | 386/46 |
| 7,075,573 B2 * | 7/2006 | Imaeda | 348/231.99 |
| 7,460,151 B2 * | 12/2008 | Minatogawa | 348/207.1 |
| 2002/0158970 A1 * | 10/2002 | Takeshi | 348/211.3 |
| 2004/0064834 A1 * | 4/2004 | Kuwata et al. | 725/86 |
| 2005/0057658 A1 * | 3/2005 | Ohmura et al. | 348/207.99 |

FOREIGN PATENT DOCUMENTS

JP 2003-032582 1/2003

* cited by examiner

*Primary Examiner*—Tuan Ho
*Assistant Examiner*—Daniel M Pasiewicz
(74) *Attorney, Agent, or Firm*—Cowan, Liebowitz & Latman, P.C.

(57) ABSTRACT

The data transfer apparatus includes a recording unit which records a plurality of image data on a first recording medium, a management unit which manages the plurality of image data by classifying the image data into a plurality of groups, an addition unit which adds one of the plurality of groups as a group of a second recording medium, a determination unit which determines a group corresponding to the group from the plurality of groups, a search unit which searches the plurality of image data for image data classified into the group determined by the determination unit, a display control unit which displays information of image data found by the search unit, and a transfer unit which transfers selected image data to a recording apparatus for recording information data on the second recording medium so as to record the selected image data on the second recording medium.

5 Claims, 19 Drawing Sheets

DATA TRANSFER APPARATUS, IMAGE CAPTURING APPARATUS, AND DATA TRANSFER SYSTEM

BACKGROUND OF THE INVENTION

1. Field of the Invention

The present invention relates to a data transfer apparatus, an image capturing apparatus, and data transfer system.

2. Description of the Related Art

In recent years, video cameras, each incorporating a large-capacity hard disk drive (to be abbreviated as an HDD hereinafter), have become commercially available. In such video cameras, an internal HDD is normally used as a temporary storage medium for image (video) data. As the recording capacity of the internal HDD increases, so too does the number of image files stored in the internal HDD.

To cope with such increases in the number of files, a technique for improving content (image file) searchability by displaying content information (e.g., titles) of the respective content (image file) recorded in the internal HDD has been proposed.

On the other hand, data recorded in the internal HDD often include image data to be stored for a longer term as well as those to be backed up. Image data (image files) to be stored for a longer term and backed up are often transferred from the internal HDD to an external recording medium such as a DVD (Digital Versatile Disk) or the like. Normally, the recording capacity of the internal HDD tends to be larger than that of the external recording medium. Hence, the internal HDD tends to record image files of various content.

For this reason, image files having less relevant content are often transferred together to the external recording medium and the amount of labor required to organize files after data transfer cannot be reduced.

In order to reduce the amount of labor required to organize files after data transfer, image files having highly relevant content must be transferred together to the external recording medium. However, with the technique disclosed in Japanese Patent Laid-Open No. 2003-32582, image files tend to have different content information (e.g., titles), and the searchability of image files with highly relevant content may be impaired. Hence, the labor for a file search before data transfer cannot be reduced.

Alternatively, video data must be selected and transferred in consideration of the recordable capacity (free space) of the external recording medium as a data transfer destination, and the operation load when transferring data to the external recording medium may increase.

SUMMARY OF THE INVENTION

The present invention provides a data transfer apparatus, an image capturing apparatus, and data transfer system, which can reduce the operational load when transferring data recorded in a recording medium to another recording medium.

A data transfer apparatus according to the first aspect of the present invention comprises: a recording unit adapted to record a plurality of image files on a first recording medium; a management unit adapted to manage the plurality of image files recorded on the first recording medium by classifying the image files into a plurality of groups; an addition unit adapted to add one of the plurality of groups as a group of a second recording medium; a determination unit adapted to determine a group corresponding to the group of the second recording medium from the plurality of groups; a search unit adapted to search the plurality of image files recorded on the first recording medium for an image file classified into the group determined by the determination unit; a display control unit adapted to display information of an image file found by the search unit on a display unit; and a transfer unit adapted to transfer the selected image file of the plurality of image files recorded on the first recording medium to a recording apparatus for recording information data on the second recording medium so as to record the selected image file on the second recording medium.

An image capturing apparatus according to the second aspect of the present invention comprises: an image capturing unit adapted to generate image data by capturing an image including an object; a recording unit adapted to record, on a first recording medium, a plurality of image files as sets of image data recorded on the first recording medium; a management unit adapted to manage the plurality of image files by classifying the image files into a plurality of groups; an addition unit adapted to add one of the plurality of groups as a group of a second recording medium; a determination unit adapted to determine a group corresponding to the group of the second recording medium from the plurality of groups; a search unit adapted to search the plurality of image files recorded on the first recording medium for an image file classified into the group determined by the determination unit; a display control unit adapted to display information of the image file found by the search unit on a display unit; and a transfer unit adapted to transfer the selected image file of the plurality of image files recorded on the first recording medium to a recording apparatus for recording information data on the second recording medium so as to record the selected image file on the second recording medium.

A data transfer system according to the third aspect of the present invention is a data transfer system in which a data transfer apparatus and an external recording apparatus are connected to be able to communicate with each other, and the data transfer apparatus is a data transfer apparatus according to the first aspects of the present invention.

According to the present invention, the operational load when transferring data to an external recording medium can be reduced.

Further features of the present invention will become apparent from the following description of exemplary embodiments with reference to the attached drawings.

DESCRIPTION OF THE EMBODIMENTS

Figure 1:
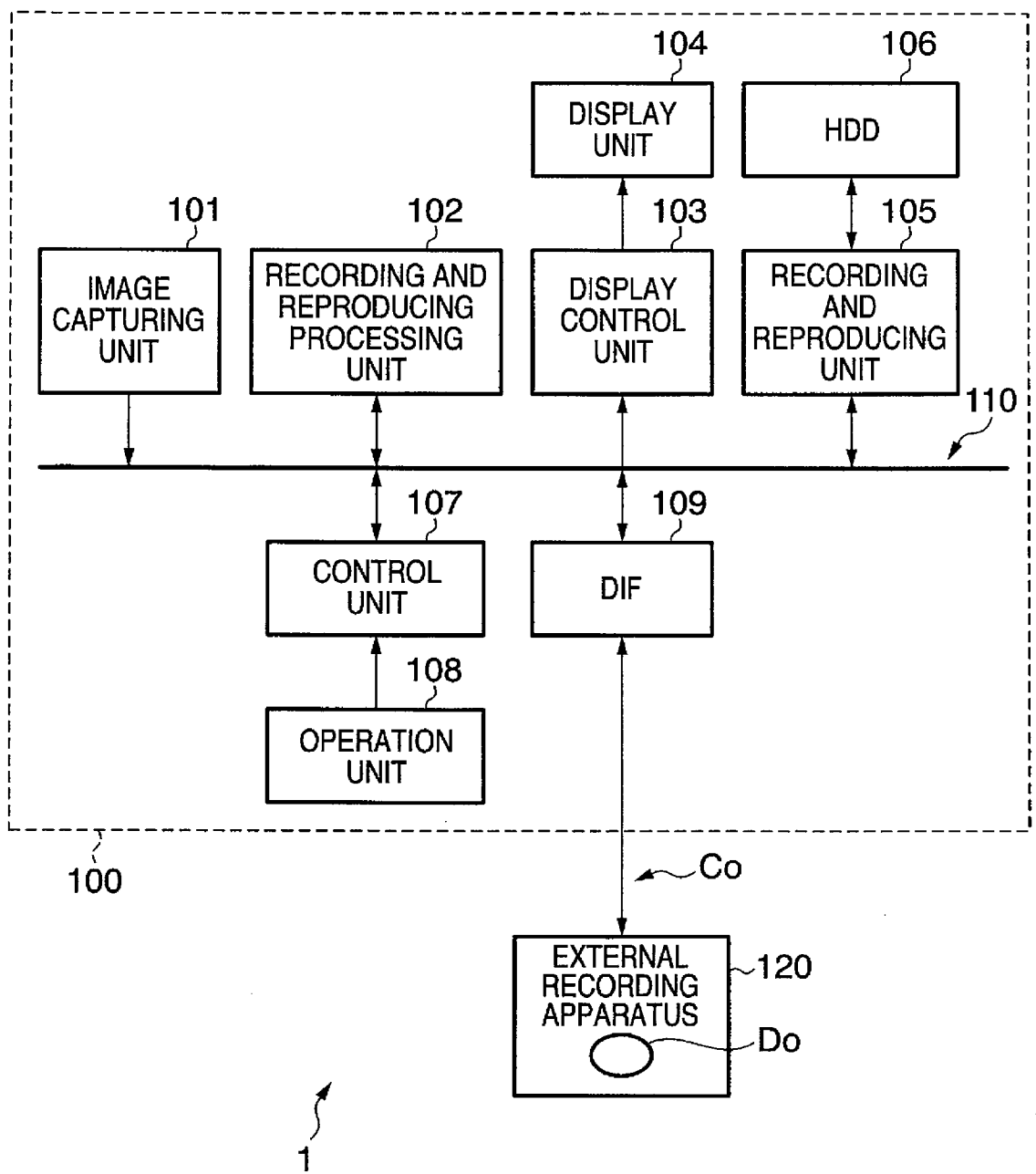
FIG. 1 is a block diagram showing the arrangement of a data transfer system according to the first embodiment of the present invention.

A data transfer system 1 according to the first embodiment of the present invention will be described below with reference to FIG. 1. FIG. 1 is a block diagram showing the arrangement of the data transfer system 1 according to the first embodiment of the present invention.

The data transfer system 1 transfers image data recorded on an internal recording medium for the purpose of long-term storage (e.g., dubbing or backup). The data transfer system 1 comprises a video camera (data transfer apparatus) 100, external recording apparatus 120, and communication cable (communication medium) C0.

The video camera 100 incorporates a hard disk.

The external recording apparatus 120 is connected to the video camera 100 via the communication cable C0 to be able to communicate with each other. The external recording apparatus 120 can record information (e.g., image data) received from the video camera 100 on a detachable external recording medium (second recording medium) D0, and can supply information recorded on the loaded external recording medium D0 to the video camera 100 and can control the video camera 100 to reproduce it. The external recording medium D0 comprises, for example, a disk-shaped high-density recording medium such as a DVD+/−R (single- or dual-layer medium), DVD+/−RW, and the like, or a card-shaped high-density recording medium such as a flash memory card and the like.

The communication cable C0 connects the video camera 100 and external recording apparatus 120. The communication cable C0 is a serial cable used to make, for example, serial communications, and is, for instance, a USB (Universal Serial Bus) cable.

The arrangement and operation of the video camera 100 will be explained below with reference to FIG. 1.

The video camera 100 shown in FIG. 1 comprises an image capturing unit 101, recording and reproducing processing unit (determination unit and search unit) 102, display control unit 103, display unit 104, recording and reproducing unit (recording unit, management unit, recording unit, and addition unit) 105, and control unit 107. The video camera 100 also comprises an operation unit (selection unit) 108 and bus 110. Furthermore, the video camera 100 comprises a hard disk drive (first recording medium, holding unit, and storage unit; to be abbreviated as an HDD hereinafter) 106 and digital interface (acquisition unit and transfer unit; to be abbreviated as a DIF hereinafter) 109.

The image capturing unit 101, recording and reproducing processing unit 102, display control unit 103, recording and reproducing unit 105, control unit 107, and DIF 109 are connected to each other via the bus 110. The display unit 104 is connected to the display control unit 103. The HDD 106 is connected to the recording and reproducing unit 105. The operation unit 108 is connected to the control unit 107. The DIF 109 is connected to the external recording apparatus 120 via the communication cable C0.

The operation of the video camera 100 upon photographing will be explained below.

The user inputs a photographing start instruction to the operation unit 108. The operation unit 108 supplies the photographing start instruction to the control unit 107. The control unit 107 outputs control signals to the respective units via the bus 110 based on the photographing start instruction. In response to the control signals, the respective units start a photographing process as follows.

The image capturing unit 101 generates an image signal by capturing an image of an object (not shown), and then converts that image signal into image data (moving image data). The image capturing unit 101 outputs the image data to the recording and reproducing processing unit 102 via the bus 110. The recording and reproducing processing unit 102 encodes the image data according to a known encoding method such as MPEG or the like, and supplies the encoded image data to the recording and reproducing unit 105 via the bus 110. The recording and reproducing unit 105 records the encoded image data on the HDD 106.

The image capturing unit 101 also supplies the image data to the display control unit 103 via the bus 110. The display control unit 103 displays an image corresponding to the image data on the display unit 104. Note that the display unit 104 serves as a viewfinder.

Then, the user inputs a photographing stop instruction to the operation unit 108. The operation unit 108 supplies the photographing stop instruction to the control unit 107. The control unit 107 outputs control signals to the respective units via the bus 110 based on the photographing stop instruction. In response to the control signals, the respective units stop the photographing process as follows.

The recording and reproducing processing unit 102 encodes the image data, and generates information indicating the end of a file (to be referred to as EOF hereinafter). The recording and reproducing processing unit 102 appends the EOF to the encoded image data, and supplies that image data to the recording and reproducing unit 105. The recording and reproducing unit 105 closes, as one file, image data which are kept recorded on the HDD 106 from when the photographing process has started until it receives the EOF, and records that image file on the HDD 106. That is, the image file is a set of image data. The recording and reproducing unit 105 updates file management information in response to recording of that image file on the HDD 106. The file management information includes identification information of the image file, information associated with the data size of the image file (data size information), and information associated with the storage address of the image file. The recording and reproducing unit 105 controls read and write accesses of information in the HDD 106 based on the file management information.

The recording and reproducing unit 105 supplies that image file to the recording and reproducing processing unit 102 via the bus 110. The recording and reproducing processing unit 102 extracts and generates representative image data (thumbnail image data, still image data) of the image file. The recording and reproducing processing unit 102 supplies the representative image data of the image file to the recording and reproducing unit 105. The recording and reproducing unit 105 records the representative image data of the image file in the HDD 106 in association with that image file.

The operation of the video camera 100 upon reproduction will be described below.

The user inputs a reproduction list display instruction to the operation unit 108. The operation unit 108 supplies the reproduction list display instruction to the control unit 107. The control unit 107 outputs control signals to the respective units via the bus 110 based on the reproduction list display instruction. In response to the control signals, the respective units start a reproduction list display process as follows.

The recording and reproducing unit 105 reproduces representative image data of image files recorded on the HDD 106, and supplies them to the display control unit 103. The display control unit 103 generates list window data of these representative image data, and displays a list window corresponding to the list window data on the display unit 104. The list window includes representative images having one-to-one correspondence with image files, and serves as a reproduction list of image files.

The user inputs, to the operation unit 108, a representative image selection instruction for selecting a desired representative image from those displayed on the display unit 104. The operation unit 108 supplies the representative image selection instruction to the control unit 107. The control unit 107 outputs control signals to the respective units via the bus 110 based on the representative image selection instruction. In response to the control signals, the respective units stop a representative image selection process as follows.

The recording and reproducing unit 105 reads out an image file related to the selected representative image from the HDD 106, and reproduces the image file corresponding to the representative image. The recording and reproducing unit 105 supplies the reproduced image file to the recording and reproducing processing unit 102. The recording and reproducing processing unit 102 decodes the reproduced image file, and supplies the decoded image file to the display control unit 103. The display control unit 103 displays an image (moving image) corresponding to the decoded image file on the display unit 104.

Note that the operation unit 108 can accept an instruction for adding a title for each image file to be recorded from the user.

For example, the user inputs a title request instruction to the operation unit 108. The operation unit 108 supplies the title request instruction to the control unit 107. The control unit 107 controls the display control unit 103 via the bus 110 based on the title request instruction. With this control, the display control unit 103 displays, on the display unit 104, a scene title input window that allows the user to input a scene title for the selected image file.

The user then inputs a scene title designation instruction to the operation unit 108 via the scene title input window displayed on the display unit 104. The scene title designation instruction is information for designating a scene title (group identification information).

Figure 3:
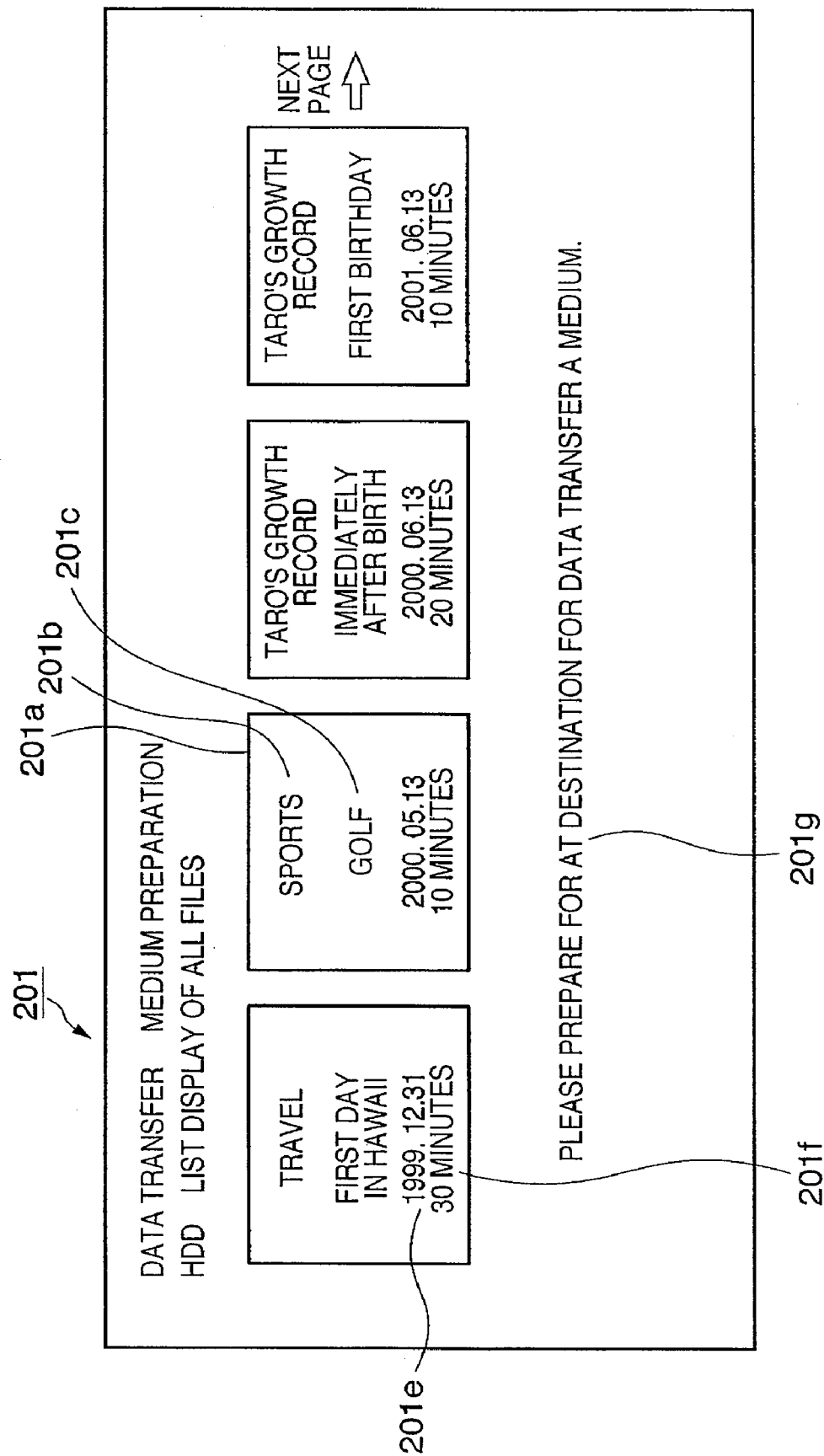
FIG. 3 shows an example of a window displayed on a display unit.
Figure 4:
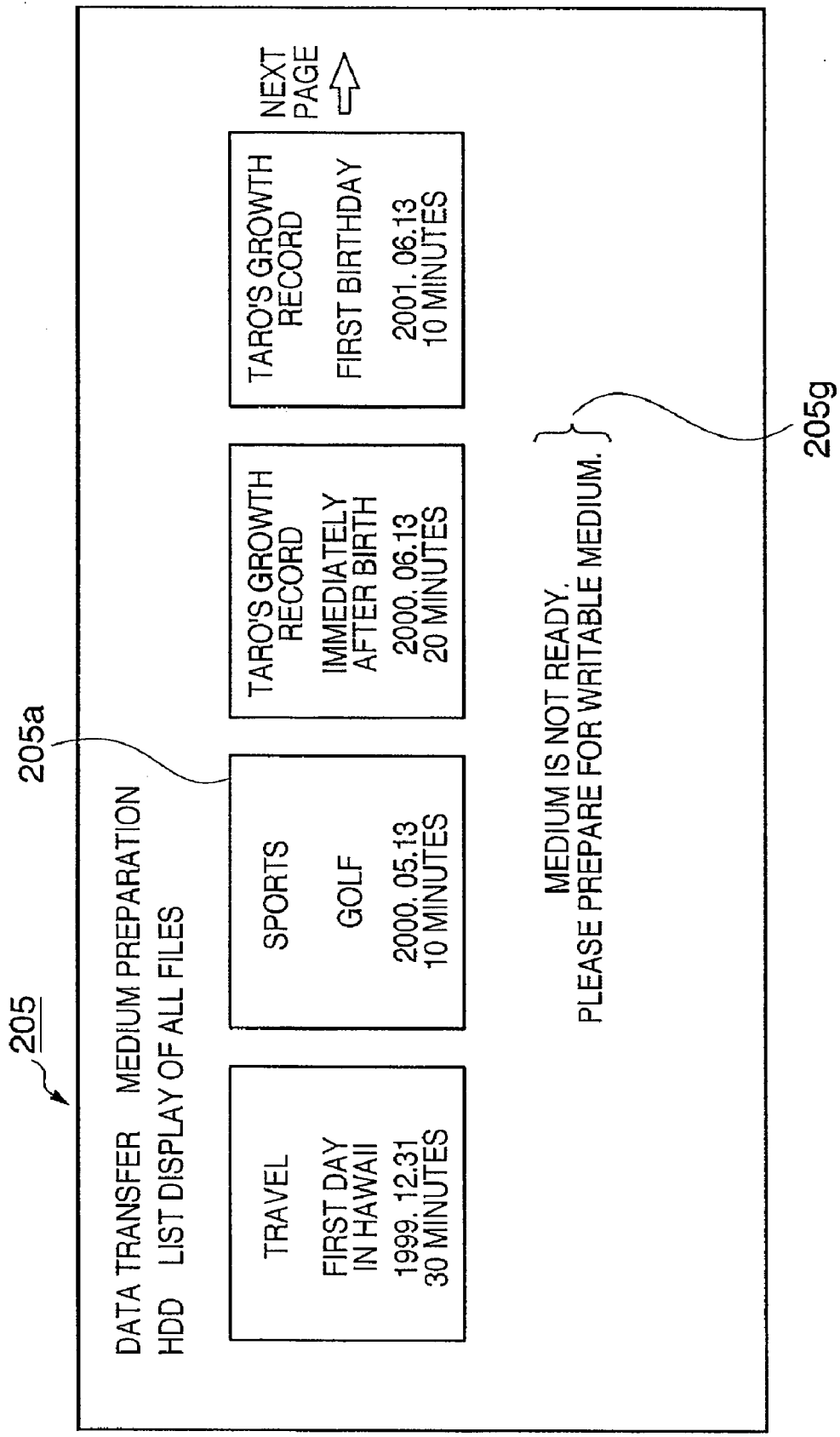
FIG. 4 shows an example of a window displayed on the display unit.

Note that the scene title is a title common to a plurality of image files; in other words, a title indicating the comprehensive idea to group the plurality of image files. That is, the scene title is information used to identify a group including at least two files of a plurality of files recorded on the HDD 106. The scene title is, for example, "travel", "sports", "Taro's growth record", or the like shown in FIG. 3. The recording and reproducing unit 105 can classify a plurality of image files recorded on the HDD 106 into groups based on scene titles, and can manage them.

Note that each image file is a group of image data of a plurality of scenes (frames), and the term "scene title" is used to have the meaning of a title for an image (representative image) of a scene that represents the image file. That is, each image file has one-to-one correspondence with a scene title. This indicates that the image file belongs to a group indicated by the scene title.

The operation unit 108 supplies the scene title designation instruction to the control unit 107. The control unit 107 supplies scene title information to the recording and reproducing unit 105 via the bus 110 based on the scene title designation instruction. The recording and reproducing unit 105 relates the scene title to representative image data, thereby recording (holding) that scene title as additional information related to the image file.

Note that the additional information that relates the scene time to the image file may be held in a nonvolatile memory (not shown) or the like in place of the HDD 106.

The operation of the video camera 100 upon data transfer (e.g., dubbing or backup) will be described below.

The user inputs a data transfer request instruction to the operation unit 108. The operation unit 108 passes the data transfer request instruction to the control unit 107. The control unit 107 outputs control signals to the respective units via the bus 110 based on the data transfer request instruction. In response to the control signals, the respective units start a medium detection process as follows.

The DIF 109 receives medium information from the external recording apparatus 120 via the communication cable C0. The medium information includes information associated with the unique ID (medium identification information), type, recordable capacity (or recordable time period), and recordable format of the external recording medium D0. The DIF 109 supplies the medium information to the recording and reproducing unit 105.

Then, the user inputs, to the operation unit 108, a representative image selection instruction for selecting a desired representative image from those displayed on the display unit 104. Note that the representative image selection instruction also serves as an instruction for selecting an image file to be transferred. The operation unit 108 supplies the representative image selection instruction to the control unit 107. The control unit 107 outputs control signals to the respective units via the bus 110 based on the representative image selection instruction. In response to the control signals, the respective units start a data transfer process as follows.

The recording and reproducing unit 105 reads out an image file related to the selected representative image from the HDD 106, and supplies that image file to the DIF 109. The DIF 109 supplies the image file to the external recording apparatus 120 via the communication cable C0. In this way, the external recording apparatus 120 records the image file on the external recording medium D0.

The recording and reproducing unit 105 generates a medium title (group information, medium management information) based on the scene title related to the image file to be transferred. The medium title is information that represents the external recording medium D0, and is, for example, "Taro's growth record" or the like shown in FIG. 7. The medium title is determined in relation to the scene title. The medium title is determined for each external recording medium D0 as a data transfer destination. The recording and reproducing unit 105 records (holds) the medium title in the HDD 106 in relation to the unique ID of the external recording medium D0 and the scene title.

Note that additional information that relates the scene title to the unique ID may be held in a nonvolatile memory (not shown) or the like in place of the HDD 106.

In this way, the unique ID of the external recording medium D0, scene title, and medium title are related to each other. As a result, even when the external recording medium D0, which has undergone data transfer up to its middle space, is loaded to the external recording apparatus 120, the medium title corresponding to this external recording medium D0 can be detected.

The image files recorded on the HDD 106 and scene titles are related to each other. As a result, a desired image file can be selected from those recorded on the HDD 106, and can be transferred to the external recording medium D0.

Figure 2:
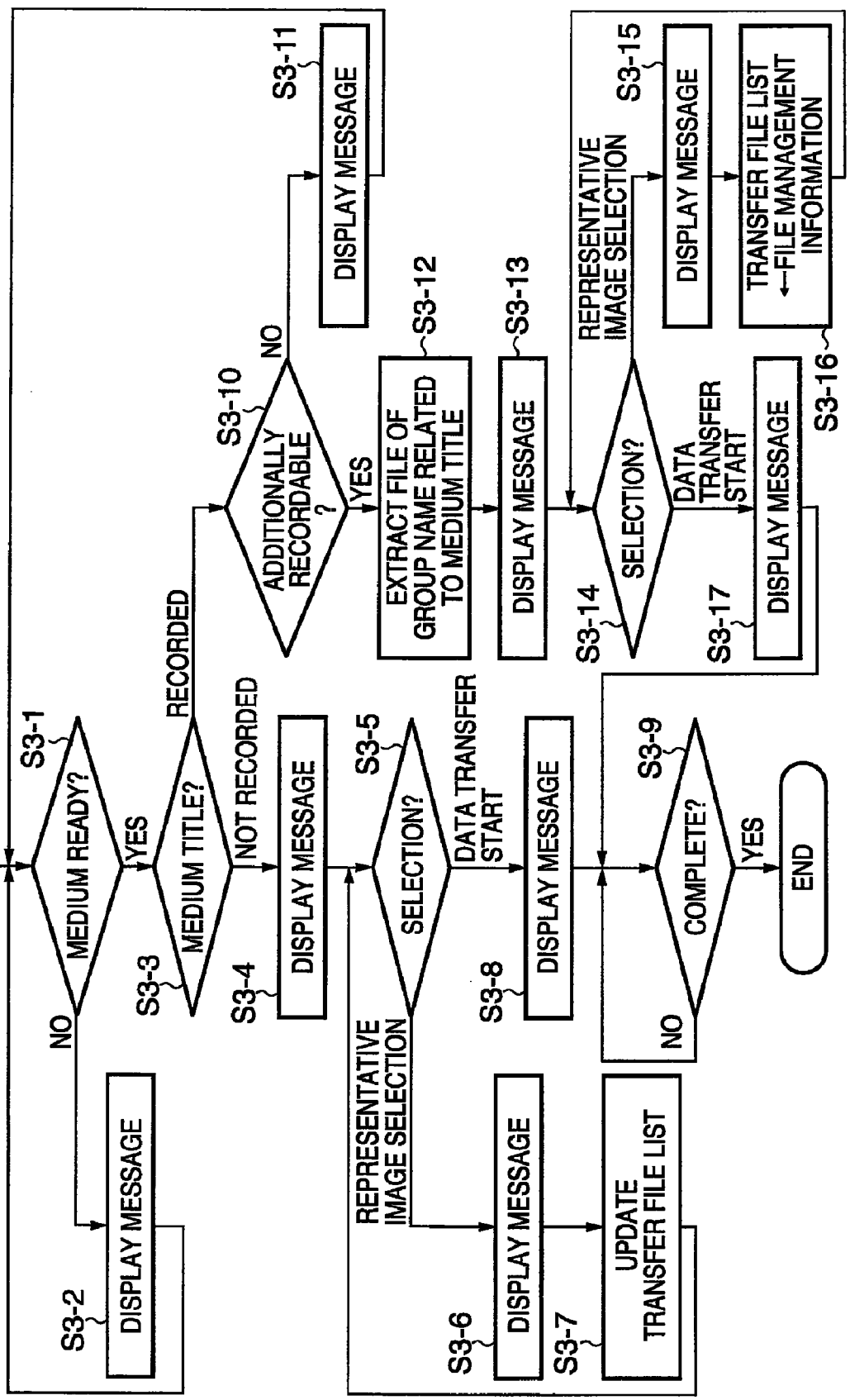
FIG. 2 is a flowchart showing the sequence of processing executed when the data transfer system transfers data.

The detailed operation of the video camera 100 upon data transfer will be described below with reference to FIGS. 2 to 10. FIG. 2 is a flowchart showing the sequence of processing executed when the data transfer system 1 transfers data. FIGS. 3 to 10 show examples of windows displayed on the display unit 104.

In step S3-1, the user inputs a data transfer request instruction to the operation unit 108 of the video camera 100. The operation unit 108 passes the data transfer request instruction to the control unit 107. The control unit 107 controls the DIF 109 via the bus 110 based on the data transfer request instruction (to execute the medium detection process).

The DIF 109 transmits a detection command used to detect the external recording medium D0 to the external recording apparatus 120 via the communication cable C0.

Upon reception of medium information from the external recording apparatus 120 via the communication cable C0 as a response to the detection command, the DIF 109 decides that the external recording medium D0 is ready. In this case, the DIF 109 advances the process to step S3-3. If the DIF 109 does not receive any medium information, it decides that the external recording medium D0 is not ready, and advances the process to step S3-2.

Note that the medium information includes information associated with the unique ID (medium identification information), type, recordable capacity (or recordable time period), and recordable format of the external recording medium D0.

In step S3-2, the DIF 109 supplies, to the control unit 107, information indicating that the external recording medium D0 is not ready. The control unit 107 controls the display control unit 103 based on the information indicating that the external recording medium D0 is not ready. The display control unit 103 displays, on the display unit 104, a window 201 indicating that the external recording medium D0 is not ready (see FIG. 3). The window 201 displays a message 201g prompting the user to make ready an external recording medium D0, and also displays a list of all files recorded on the HDD 106, and the like.

For example, the window 201 displays a representative image 201a, scene title 201b, file name 201c, photographing date and time 201e, and photographing time period 201f. The representative image 201a is a still image (not shown) of a specific frame in an image file. The scene title 201b follows the scene title designation instruction input to the operation unit 108, and is sometimes the same as that of another image file. The file name 201c is information required to identify each image file, and is unique to the image file recorded on the HDD 106. The photographing date and time 201e is acquired from an internal clock (not shown) when the image capturing unit 101 captured the image. The photographing time period 201f is a value converted from the data size of the image file.

In step S3-3, the DIF 109 supplies the medium information to the recording and reproducing processing unit 102. The recording and reproducing processing unit 102 accesses the HDD 106 via the recording and reproducing unit 105 to check if the medium title related to the unique ID and scene title included in the medium information is recorded on the HDD 106. If the recording and reproducing processing unit 102 determines that the medium title is recorded, the process advances to step S3-10; otherwise, the process advances to step S3-4.

In step S3-4, the recording and reproducing processing unit 102 supplies, to the control unit 107, information indicating that no medium title is recorded. The control unit 107 controls the display control unit 103 based on the information indicating that no medium title is recorded. The display control unit 103 displays, on the display unit 104, a window 202 indicating that no medium title is recorded (see FIG. 5). The window 202 displays: a message 202g that prompts the user to select a file, a list display of all files recorded on the HDD 106, information 202j indicating that no medium title is recorded, medium information 202i, and the like. The list of all the files includes a representative image 202a having one-to-one correspondence with each file, as in the window 201 shown in FIG. 3.

Figure 5:
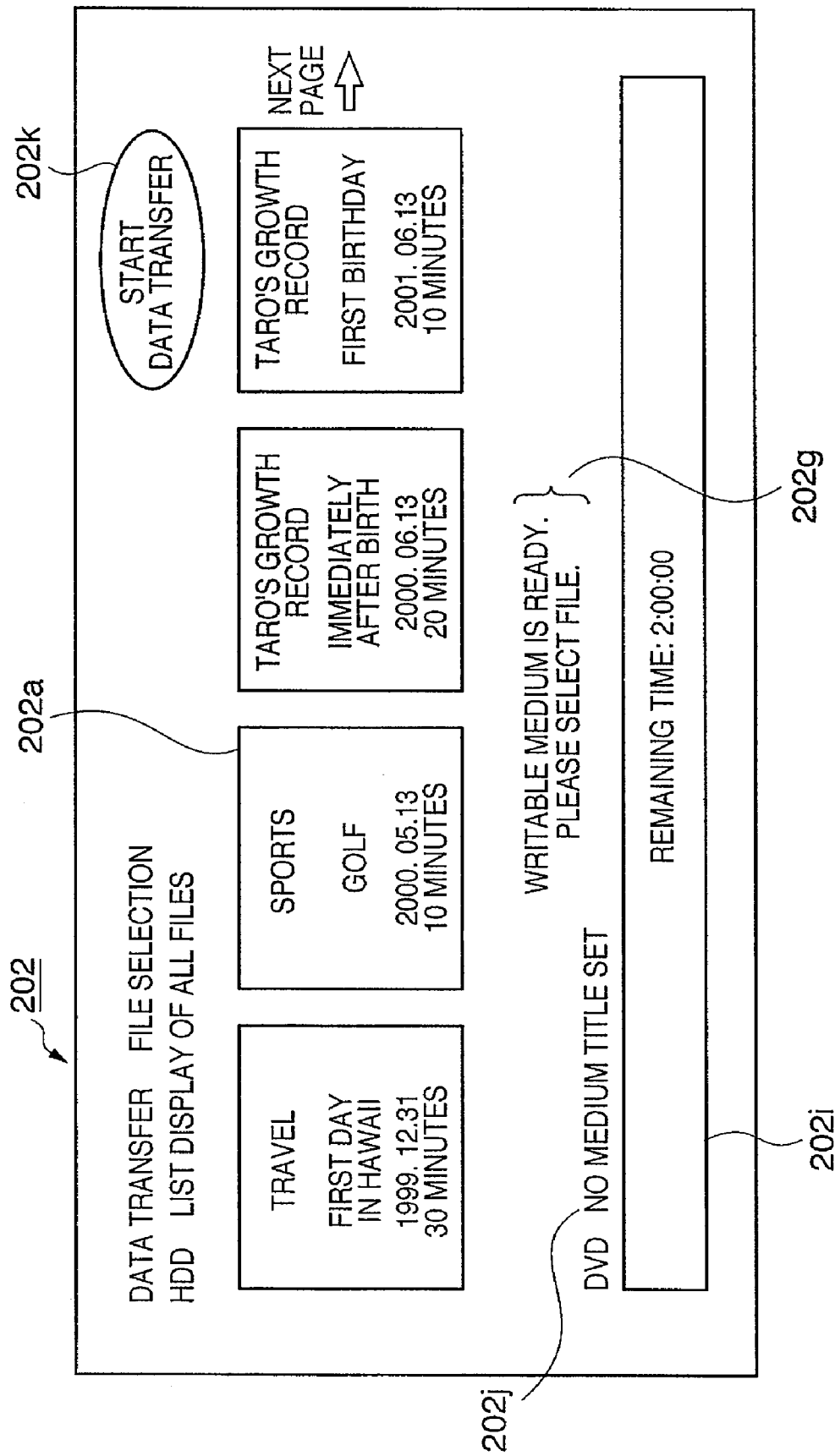
FIG. 5 shows an example of a window displayed on the display unit.
Figure 6:
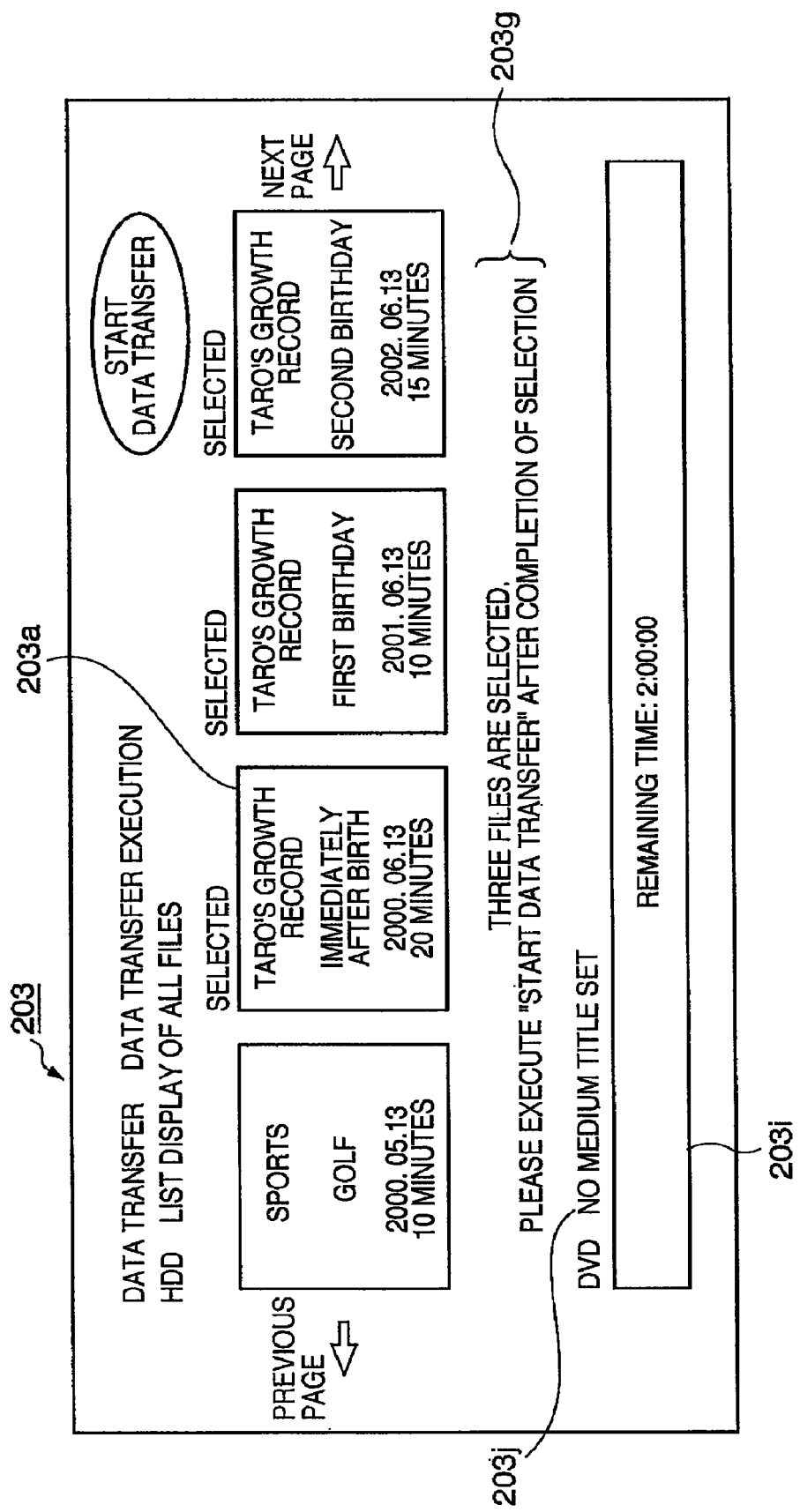
FIG. 6 shows an example of a window displayed on the display unit.

If the user inputs a representative image selection instruction that selects a desired representative image to the operation unit 108 (for example, if the user clicks the representative image 202a shown in FIG. 5), the control unit 107 receives the representative image selection instruction from the operation unit 108 in step S3-5. The representative image selection instruction also serves as an instruction for selecting an image file. Or if the user inputs a data transfer start instruction for starting data transfer to the operation unit 108 (for example, if the user clicks a "start data transfer" button 202k shown in FIG. 5), the control unit 107 receives the data transfer start instruction from the operation unit 108.

Upon reception of the representative image selection instruction, the control unit 107 decides that the representative image selection instruction is selected, and advances the process to step S3-6. Upon reception of the data transfer start instruction, the control unit 107 decides that the data transfer start instruction is selected, and advances the process to step S3-8.

In step S3-6, the control unit 107 controls the display control unit 103 based on the representative image selection instruction. The display control unit 103 displays, on the display unit 104, a window 203 indicating that the representative image selection instruction is input (see FIG. 6). The window 203 displays: a message 203g that prompts the user to press the "start data transfer" button, a list display of all files recorded in the HDD 106, information 203j indicating that no medium title is recorded, medium information 203i, and the like. The list of all the files includes a representative image 203a having one-to-one correspondence with each file, as in the window 201 shown in FIG. 3. Each representative image 203a indicated by the representative image selection instruction is, for example, highlighted to indicate selection of that image.

In step S3-7, the control unit 107 supplies the representative image selection instruction to the recording and reproducing processing unit 102. The recording and reproducing processing unit 102 accesses the HDD 106 via the recording and reproducing unit 105 based on the representative image selection instruction. If the recording and reproducing processing unit 102 decides that no transfer file list is recorded in the HDD 106, it creates a new transfer file list; otherwise, it opens the transfer file list. The recording and reproducing processing unit 102 updates the transfer file list by additionally writing information (e.g., file name) required to identify an image file corresponding to the representative image indicated by the representative image selection instruction in the transfer file list.

Note that the processes in steps S3-5 to S3-7 are repetitively executed every time the user inputs a representative image selection instruction to the operation unit 108.

In step S3-8, the control unit 107 controls the recording and reproducing unit 105 via the bus 110 based on the data transfer start instruction. The recording and reproducing unit 105 reads out an image file related to the selected representative image from the HDD 106 with reference to the transfer file list in the HDD 106, and supplies that image file to the DIF 109. The DIF 109 supplies the image file to the external recording apparatus 120 via the communication cable C0. With this process, the external recording apparatus 120 records the image file on the external recording medium D0. Upon reception of a response indicating completion of recording of the transferred image file from HDD 106 to the external recording apparatus 120 via the communication cable C0, the DIF 109 supplies the response indicating completion of recording of the image file to the recording and reproducing unit 105. The recording and reproducing unit 105 deletes that image file from the HDD 106 in response to the response indicating completion of recording of the image file.

Figure 7:
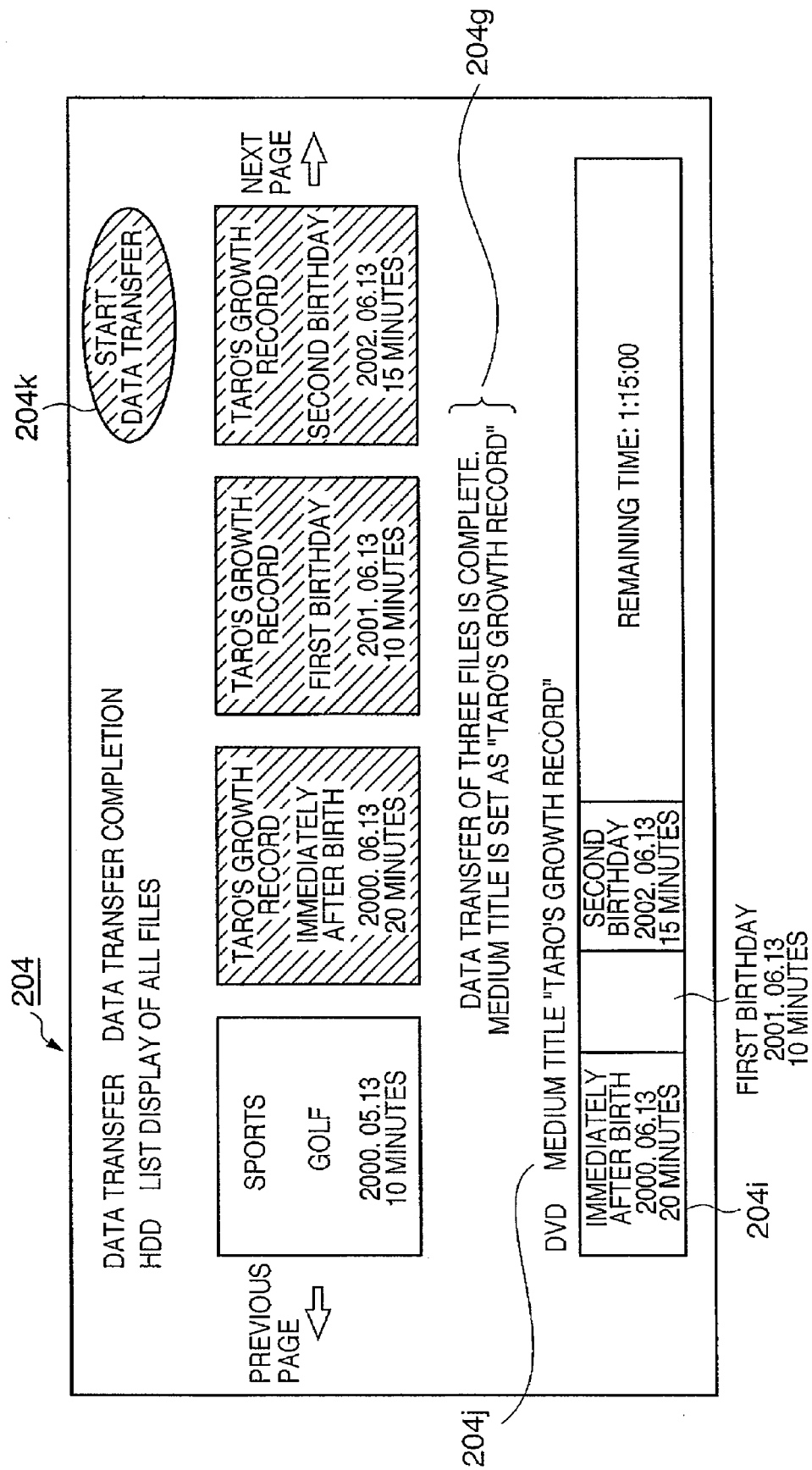
FIG. 7 shows an example of a window displayed on the display unit.

The recording and reproducing unit 105 generates a medium title based on the scene title related to the image file to be transferred. The medium title is, for example, "Taro's growth record" or the like as shown in FIG. 7. As the medium title, for example, the scene title may be used intact. If a plurality of image files to be transferred have different scene titles "A" and "B", the medium title may be determined as "A+B" as a combination of them. In this case, a search key "A" or "B" can be easily generated from the medium title "A+B". Alternatively, the medium title may be determined as "C" which represents the broader concept of "A" and "B". In this case, if information indicating that "C" is the broader concept of "A" and "B" (relation information of search keys) is recorded on, for example, the HDD 106, a search key "A" or "B" can be easily generated from the medium title "C". The medium title is determined for each external recording medium D0 as a data transfer destination. The recording and reproducing unit 105 records the medium title in the HDD 106 in relation to the unique ID (medium identification information) of the external recording medium D0 and the scene title.

Furthermore, the control unit 107 controls the display control unit 103 based on the data transfer start instruction. The display control unit 103 displays, on the display unit 104, a window indicating the data transfer start instruction (see FIG. 7). The window 204 displays: a message 204g indicating the progress of the data transfer process, a list display of all files recorded in the HDD 106, information 204j indicating the medium title, medium information 204i, a "start data transfer" button 204k, and the like. The "start data transfer" button 204k is highlighted to indicate that it has been selected (pressed).

In step 3-9, the DIF 109 compares the responses indicating completion of recording of transferred image files with the transfer file list to check if it has received the response indicating completion of recording of all image files to be transferred from HDD 106 to the external recording apparatus 120 via the communication cable C0. If the DIF 109 has received the responses indicating completion of recording of all the image files to be transferred from HDD 106 to the external recording apparatus 120 via the communication cable C0, it decides that data transfer is complete. In this case, the DIF 109 ends the process. If the DIF 109 has not received the responses indicating completion of recording of all the image files to be transferred yet, it decides that data transfer is not yet complete, and repeats step S3-9.

The recording and reproducing processing unit 102 checks based on the medium information in step S3-10 if the external recording medium D0 loaded to the external recording apparatus 120 allows additional recording. That is, the recording and reproducing processing unit 102 specifies the recordable capacity (free space size) of the external recording medium D0 based on the medium information, and compares the recordable capacity of the external recording medium D0 with the data size of an average image file. If the recordable capacity of the external recording medium D0 is larger than the data size of an average image file, the recording and reproducing processing unit 102 decides that the external recording medium D0 will allow additional recording; otherwise, it decides that the external recording medium D0 will not allow any additional recording.

Note that the data size of an average image file may be a value set as a default or may be calculated by averaging the data sizes of image files recorded on the HDD 106. The recording and reproducing processing unit 102 may compare the recordable capacity of the external recording medium D0 with the minimum data size of an image file recorded on the HDD 106 to see if the external recording medium D0 allows additional recording. Alternatively, the recording and reproducing processing unit 102 may compare the recordable capacity of the external recording medium D0 with the maximum data size of an image file recorded on the HDD 106 to see if the external recording medium D0 will allow additional recording.

If the recording and reproducing processing unit 102 decides that the external recording medium D0 allows additional recording, the process advances to step S3-12; otherwise, the process advances to step S3-11.

In step S3-11, the recording and reproducing processing unit 102 supplies, to the control unit 107, information indicating that additional recording is not allowed. The control unit 107 controls the display control unit 103 based on the information indicating that additional recording is not allowed. The display control unit 103 displays, on the display unit 104, a window 205 indicating that the external recording medium D0 does not allow any additional recording (see FIG. 4). The window 205 displays: a message 205g indicating that additional recording is not allowed, a list display of all files recorded on the HDD 106, and the like. The list display of all the files includes a representative image 205a having one-to-one correspondence with each file as in the window 201 shown in FIG. 3.

In step S3-12, the recording and reproducing processing unit 102 accesses the HDD 106 via the recording and reproducing unit 105 to search for image files corresponding to the scene title related to the medium title. For example, the recording and reproducing processing unit 102 searches for image files corresponding to the scene title that matches the medium title. Alternatively, for example, the recording and reproducing processing unit 102 searches for image files corresponding to a scene title that matches a search key generated from the medium title.

In step S3-13, the control unit 107 receives the search result information from the recording and reproducing processing unit 102. The control unit 107 controls the display control unit 103 based on the search result of the recording and reproducing processing unit 102. The display control unit 103 displays, on the display unit 104, a window 206 indicating the search result of the recording and reproducing processing unit 102 (see FIG. 8). The window 206 displays: a message 206g that prompts the user to select a file, a list display of files which are extracted as a result of the search conducted by the recording and reproducing processing unit 102, information 206j indicating the medium title, medium information 206i, a "start data transfer" button 206k, and the like.

Figure 8:
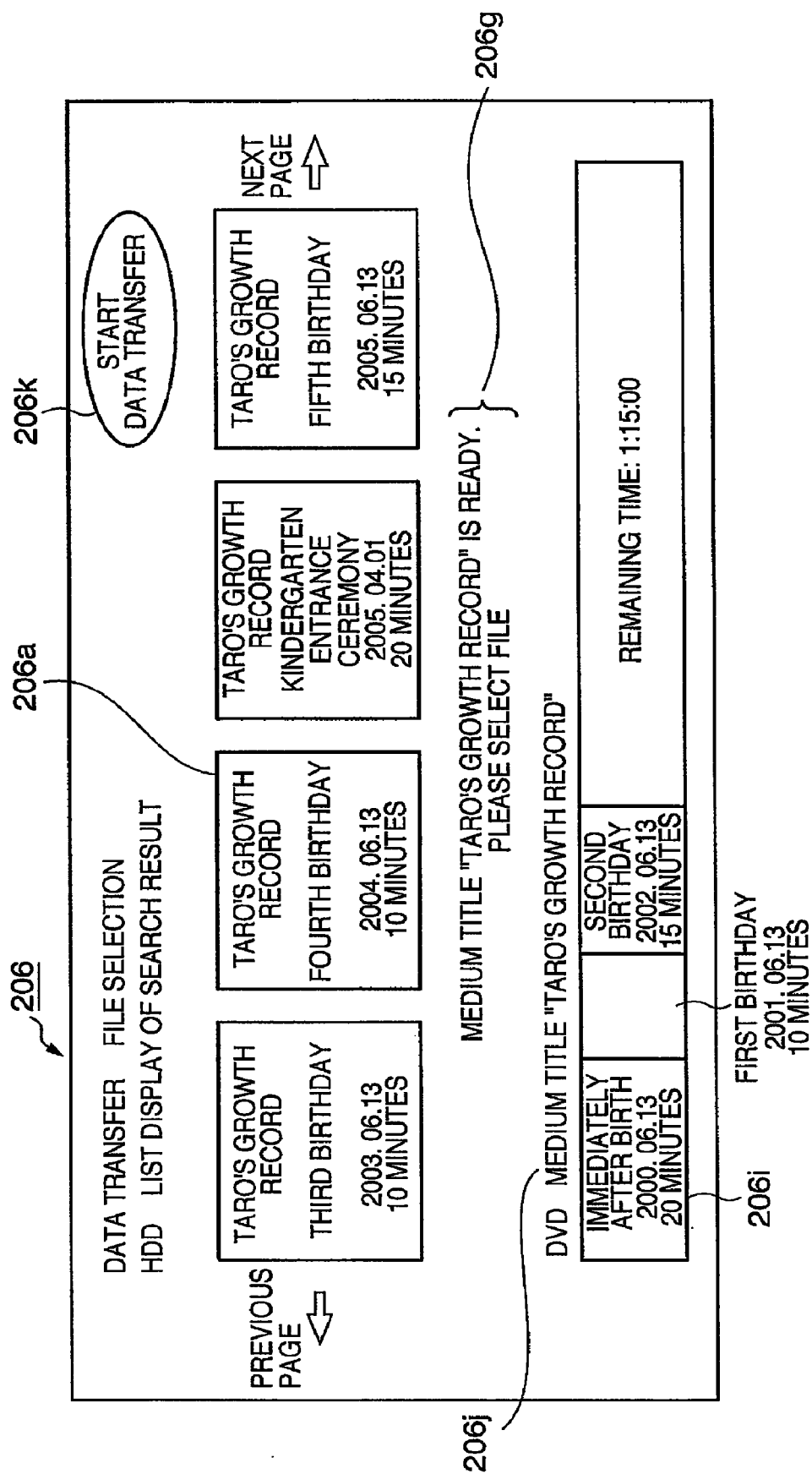
FIG. 8 shows an example of a window displayed on the display unit.
Figure 9:
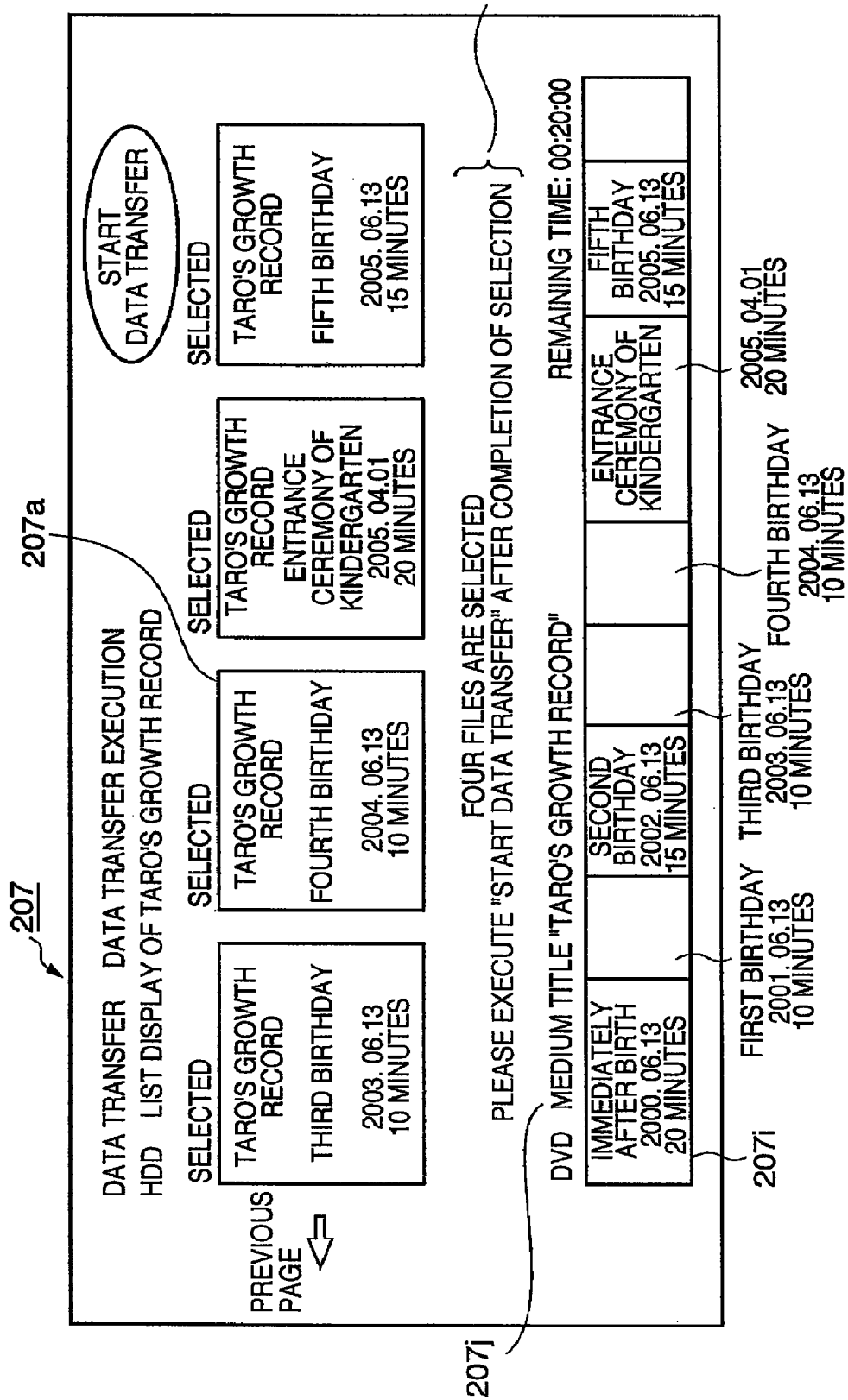
FIG. 9 shows an example of a window displayed on the display unit.
Figure 10:
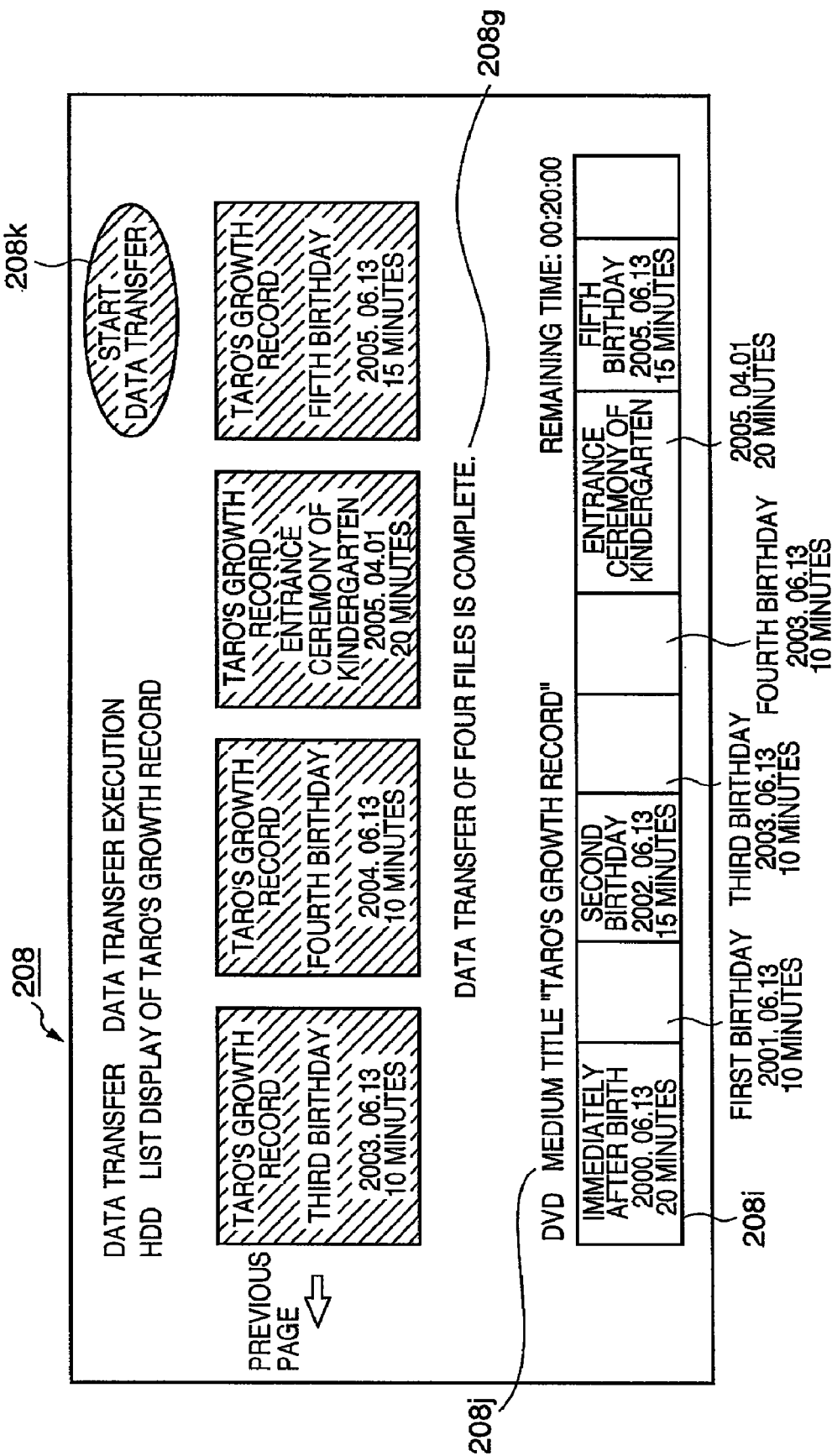
FIG. 10 shows an example of a window displayed on the display unit.

If the user inputs a representative image selection instruction for selecting a desired representative image to the operation unit 108 (for example, if the user clicks a representative image 206a shown in FIG. 8), the control unit 107 receives the representative image selection instruction from the operation unit 108 in step S3-14. The representative image selection instruction also serves as an instruction for selecting an image file. Or if the user inputs a data transfer start instruction required to start data transfer to the operation unit 108 (for example, if the user clicks the "start data transfer" button 206k shown in FIG. 8), the control unit 107 receives the data transfer start instruction from the operation unit 108.

Upon reception of the representative image selection instruction, the control unit 107 decides that the representative image selection instruction is selected, and advances the process to step S3-15. Upon reception of the data transfer start instruction, the control unit 107 decides that the data transfer start instruction is selected, and advances the process to step S3-17.

In step S3-15, the control unit 107 controls the display control unit 103 based on the representative image selection instruction. The display control unit 103 displays, on the display unit 104, a window 207 indicating the representative image selection instruction (see FIG. 9). The window 207 displays: a message 207g that prompts the user to press the "start data transfer" button, a list display of all files recorded on the HDD 106, information 207j indicating the medium title, medium information 207i, and the like. The list display of all the files includes a representative image 207a having one-to-one correspondence with each file as in the window 201 shown in FIG. 3. The representative image 207a designated by the representative image selection instruction is, for example, highlighted to indicate its selection.

In step S3-16, the control unit 107 supplies the representative image selection instruction to the recording and reproducing processing unit 102. The recording and reproducing processing unit 102 accesses the HDD 106 via the recording and reproducing unit 105 based on the representative image selection instruction. If the recording and reproducing processing unit 102 decides that no transfer file list is recorded on the HDD 106, it creates a new transfer file list; otherwise, it opens the existing transfer file list. The recording and reproducing processing unit 102 additionally writes information required to identify an image file corresponding to the representative image indicated by the representative image selection instruction (e.g., file name) in the transfer file list.

Note that the processes in steps S3-14 to S3-16 are repetitively executed every time the user inputs the representative image selection instruction to the operation unit 108.

In step S3-17, the control unit 107 controls the recording and reproducing unit 105 via the bus 110 based on the data transfer start instruction. The recording and reproducing unit 105 sequentially reads out each selected image file from the HDD 106 with reference to the transfer file list in the HDD 106, and supplies the readout image file to the DIF 109. The DIF 109 supplies the image file to the external recording apparatus 120 via the communication cable C0. The external recording apparatus 120 additionally records the image file on the external recording medium D0. Upon reception of a response indicating completion of recording of the transferred image file from HDD 106 to the external recording apparatus 120 via the communication cable C0, the DIF 109 supplies the response indicating completion of recording of the image file to the recording and reproducing unit 105. The recording and reproducing unit 105 deletes the given image file from the HDD 106 in accordance with the response indicating completion of recording of the image file.

The control unit 107 controls the display control unit 103 based on the data transfer start instruction. The display control unit 103 displays, on the display unit 104, a window 208 indicating the data transfer start instruction (see FIG. 10). The window 208 displays: a message 208g indicating the progress of the data transfer process, a list display of all files recorded on the HDD 106, information 208j indicating the medium title, medium information 208i, a "start data transfer" button 208k, and the like. The "start data transfer" button 208k is, for example, highlighted to indicate that it has been selected (pressed).

As described above, the scene title (group identification information) that represents image files is a title common to a plurality of image files; that is, it indicates a comprehensive idea used to group these image files. This scene title is recorded on the HDD 106 in relation to respective image files. Thus, upon searching for image files having highly relevant content, the labor required for a file search before data transfer can be reduced.

The recording and reproducing unit 105 sets the medium title that represents the external recording medium in relation to the scene title of image files. This medium title is recorded on the HDD 106 to correspond with the unique ID (medium identification information) of the external recording medium D0 and the scene title. The data transfer apparatus can thus prompt the user to transfer image files having highly relevant content to the external recording medium D0 together, thus reducing the labor required for organizing files after data transfer.

Furthermore, even when image files to be transferred to the external recording medium have highly relevant content but different scene title names representing the image files, the recording and reproducing unit 105 can determine the medium title to represent the broader concept of the different scene titles. In this way, the user can easily recognize the relevance of a plurality of image files recorded on the external recording medium, thus reducing the labor required for organizing files after data transfer.

The unique ID of the external recording medium D0 and the medium title are recorded in the HDD 106 in correspondence with each other. As a result, even when the external recording medium D0, which has undergone data transfer up to its middle space, is loaded onto the external recording apparatus 120, the medium title corresponding to this external recording medium D0 can be detected. Then, the recording and reproducing unit 105 can search the HDD 106 for image files with a high relevance to those which are recorded on the external recording medium D0. In this way, the labor required for a file search before (second or subsequent) data transfer can be reduced.

As described above, the operational load when transferring data to the external recording medium can be reduced.

Note that the external recording medium may be randomly accessible recording media other than that described above.

This embodiment has explained the case wherein image files recorded in the internal HDD of the video camera are transferred to and recorded in the external recording medium.

However, the present invention can be applied to a case wherein a recording medium other than the internal HDD is used.

That is, the present invention can be similarly applied to an arrangement in which data recorded on a removable recording medium represented by large-capacity optical disks such as a Blu-ray disk and the like are transferred to and recorded on another recording medium.

The unique ID of the external recording medium D0 and the medium title are recorded on the HDD 106 in correspondence with each other. When dubbing image files to the external recording medium D0, the medium title information may be transferred together, and may be recorded on the external recording medium D0.

When transferring image files to the external recording medium D0 next time, the medium title information recorded on the external recording medium D0 may be received from the external recording apparatus to acquire the medium title of the external recording medium D0.

Figure 11:
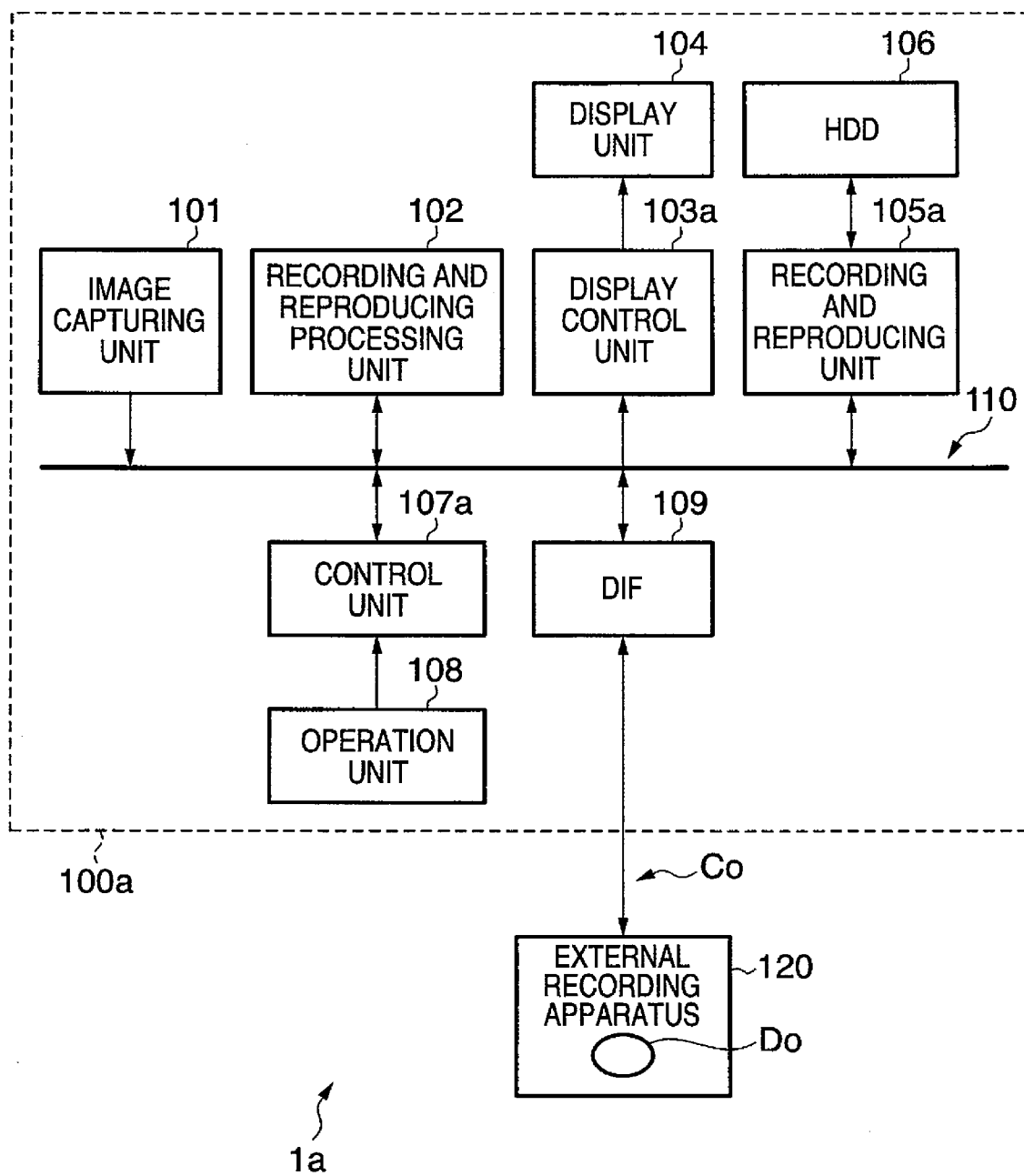
FIG. 11 is a block diagram showing the arrangement of a data transfer system according to the second embodiment.
Figure 12:
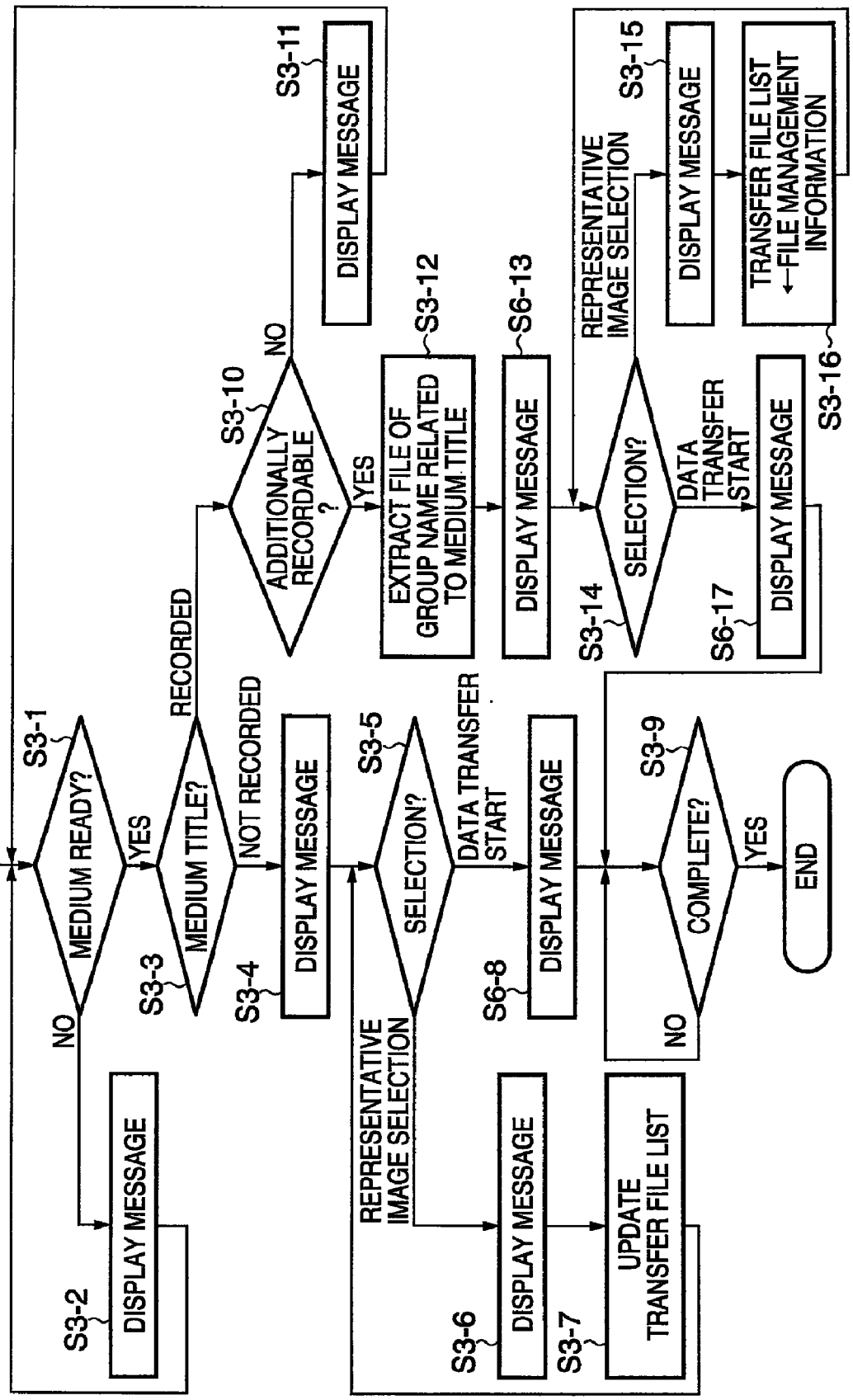
FIG. 12 is a flowchart showing the sequence of processing executed when the data transfer system transfers data.
Figure 13:
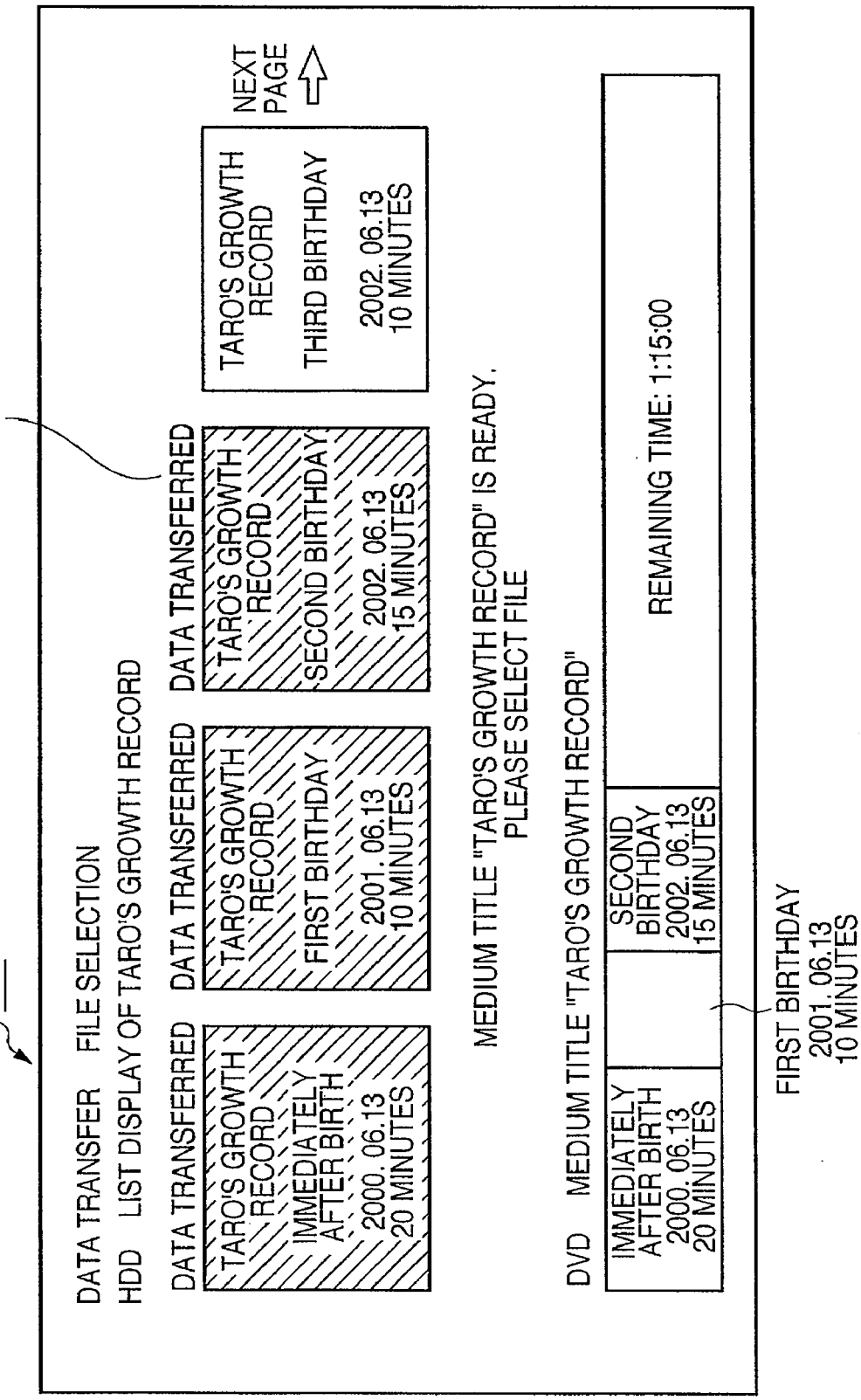
FIG. 13 shows an example of a window displayed on a display unit.

A data transfer system 1a according to the second embodiment of the present invention will be described below with reference to FIGS. 11 to 13. FIG. 11 is a block diagram showing the arrangement of the data transfer system 1a according to the second embodiment. FIG. 12 is a flowchart showing the sequence of processing executed when the data transfer system 1a transfers data. FIG. 13 shows an example of a window displayed on the display unit 104.

The data transfer system 1a has the same basic arrangement as in the first embodiment, except that it comprises a video camera 100a. Unlike in the first embodiment, the video camera 100a comprises a display control unit 103a, recording and reproducing unit 105a, and control unit 107a.

The control unit 107a controls the display control unit 103a. The display control unit 103a displays a window 506 shown in FIG. 13 on the display unit 104 in place of the window 206 shown in FIG. 8.

In the first embodiment, the image file already transferred to the external recording medium is deleted from the HDD 106. However, the recording and reproducing unit 105a does not delete any image file whose data transfer is complete from the HDD 106.

The sequence of processing executed when the data transfer system 1a transfers data is different from the first embodiment in the following processes, as shown in FIG. 12.

In step S6-8, the recording and reproducing unit 105a does not delete an image file from the HDD 106 even when it receives a response indicating completion of recording of that image file. The recording and reproducing unit 105a additionally records information indicating completion of transfer to the already transferred image file. Other processes are the same as those in step S3-8 shown in FIG. 2.

In step S6-13, the control unit 107a receives the search result information from the recording and reproducing processing unit 102. The control unit 107a controls the display control unit 103a based on the search result of the recording and reproducing processing unit 102. The display control unit 103a displays, on the display unit 104, the window 506 indicating the search result of the recording and reproducing processing unit 102 (see FIG. 13). The window 506 identifiably displays information 506n indicating completion of data transfer for each image file unlike in the window 206 shown in FIG. 8.

With this information, image files whose data transfer is complete, and those whose data transfer is not made can be easily distinguished from each other.

In step S6-17, the recording and reproducing unit 105a does not delete an image file from the HDD 106 even when it receives a response indicating completion of recording of that image file. Other processes are the same as those in step S3-17 shown in FIG. 2.

Figure 14:
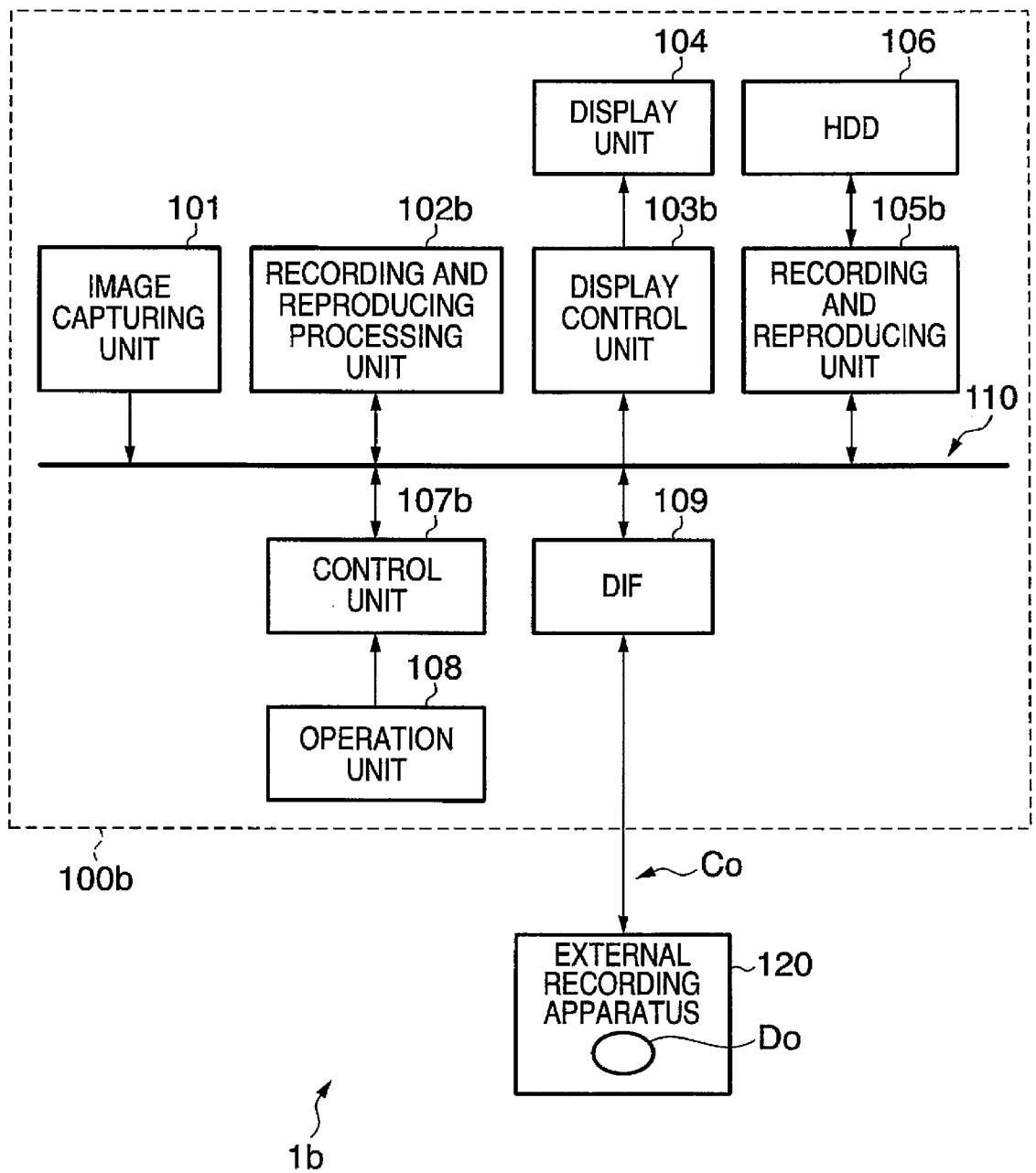
FIG. 14 is a block diagram showing the arrangement of a data transfer system according to the third embodiment.
Figure 15:
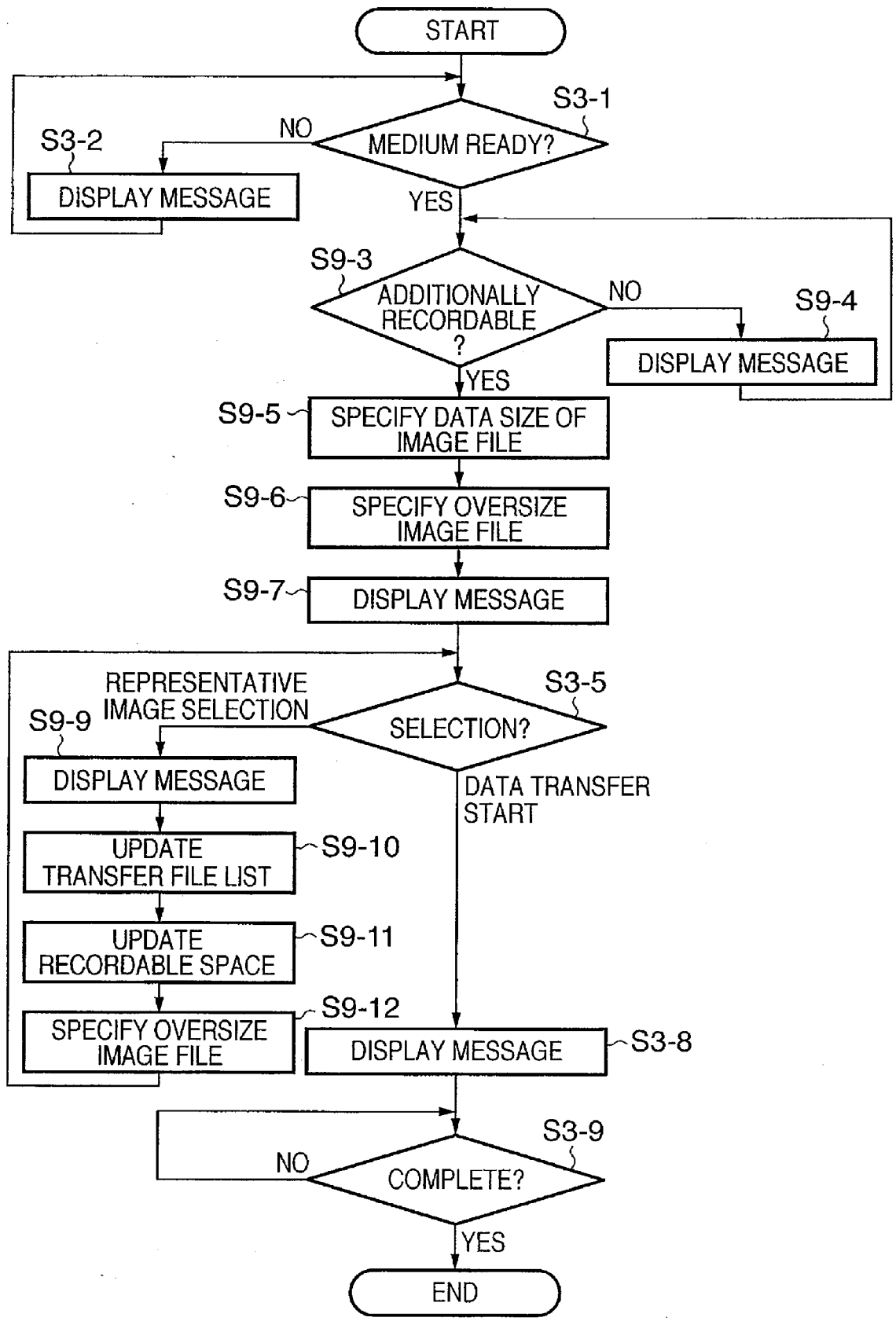
FIG. 15 is a flowchart showing the sequence of processing executed when the data transfer system transfers data.
Figure 16:
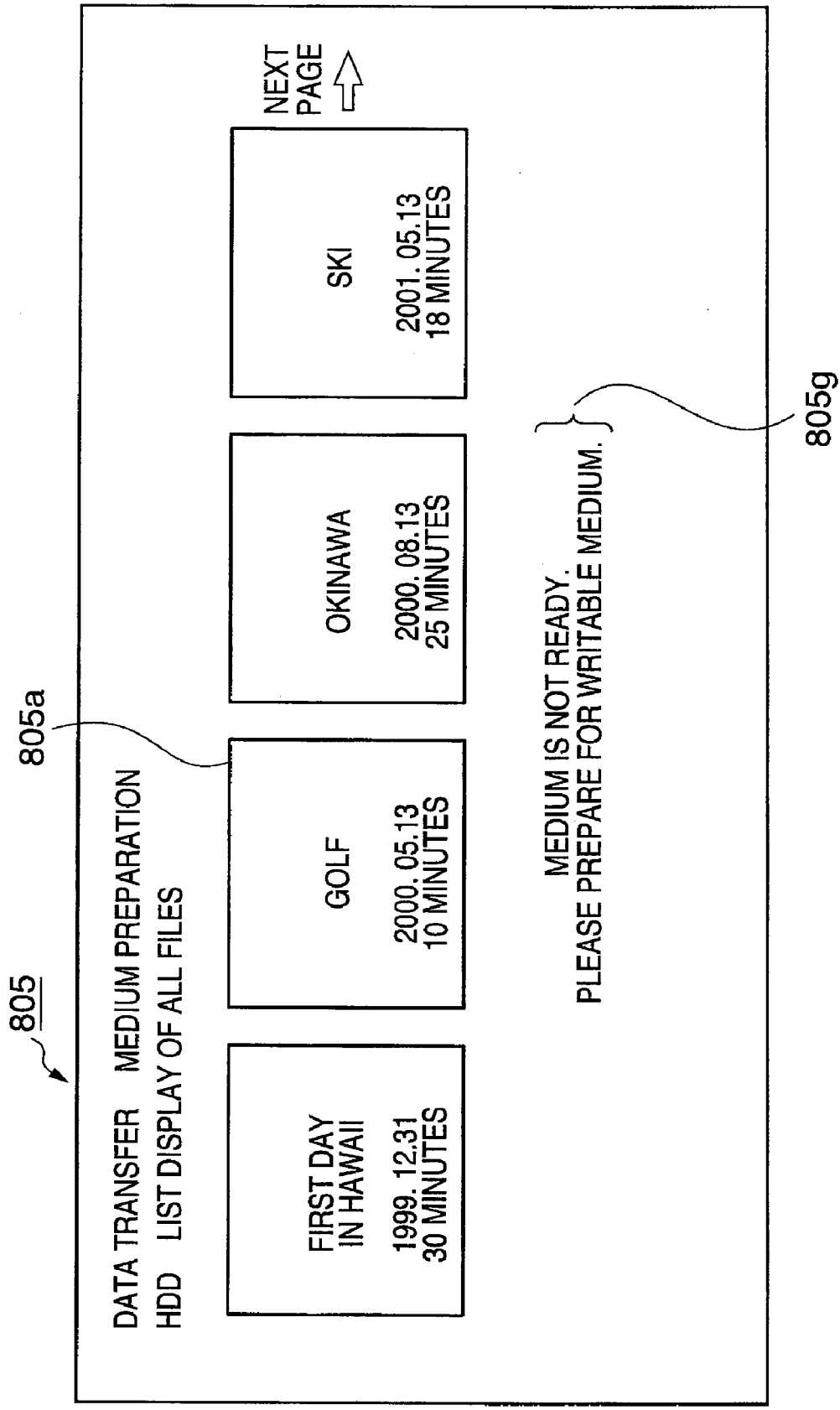
FIG. 16 shows an example of a window displayed on a display unit.
Figure 17:
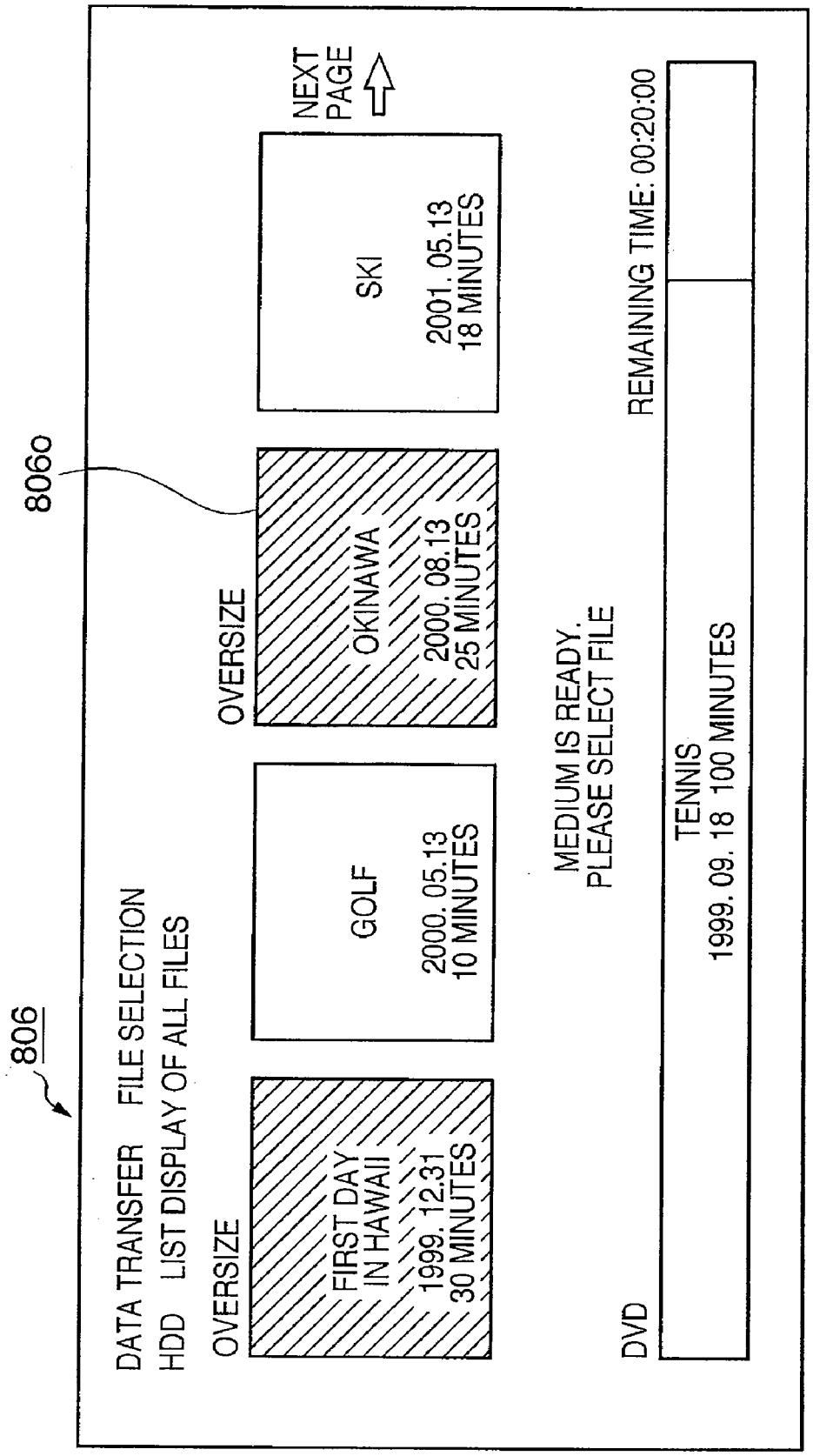
FIG. 17 shows an example of a window displayed on the display unit.

A data transfer system 1b according to the third embodiment of the present invention will be described below with reference to FIGS. 14 to 19. FIG. 14 is a block diagram showing the arrangement of the data transfer system 1b according to the third embodiment. FIG. 15 is a flowchart showing the sequence of processing executed when the data transfer system 1b transfers data. FIGS. 16 to 19 show examples of windows to be displayed on the display unit 104.

The data transfer system 1b has the same basic arrangement as that in the first embodiment, except that it comprises a video camera 100b. The video camera 100b comprises a recording and reproducing processing unit (update unit and specifying unit) 102b, display control unit 103b, recording and reproducing unit 105b, and control unit 107b unlike in the first embodiment.

The sequence of processing executed when the data transfer system 1b transfers data is different from the first embodiment in the following processes, as shown in FIG. 15.

The recording and reproducing processing unit 102b checks based on the medium information in step S9-3 if the external recording medium D0 loaded to the external recording apparatus 120 allows additional recording. That is, the recording and reproducing processing unit 102b specifies information (recordable capacity information, medium management information) indicating the recordable capacity (free space size) of the external recording medium D0 based on the medium information. The recording and reproducing processing unit 102b compares the recordable capacity of the external recording medium D0 with the data size of an average image file to see if the external recording medium D0 will allow additional recording. If the recordable capacity of the external recording medium D0 is larger than the data size of an average image file, the recording and reproducing processing unit 102b decides that additional recording should be allowed; otherwise, it decides that additional recording should not be allowed.

If the recording and reproducing processing unit 102b decides that additional recording is allowed, the process advances to step S9-5; otherwise, the process advances to step S9-4.

In step S9-4, the recording and reproducing processing unit 102b supplies information to the control unit 107b indicating that additional recording is not allowed. The control unit 107b controls the display control unit 103b based on the information indicating that additional recording is not allowed. The display control unit 103b displays, on the display unit 104, a window 805 indicating that the external recording medium D0 will not allow additional recording (see FIG. 16). The window 805 displays: a message 805g indicating that additional recording should not be allowed, a list display of all files recorded in the HDD 106, and the like. The list display of all the files includes a representative image 805a having one-to-one correspondence with each file as in the window 201 shown in FIG. 3.

In step S9-5, the recording and reproducing processing unit 102b accesses the HDD 106 via the recording and reproducing unit 105b to acquire file management information recorded on the HDD 106. The file management information includes identification information, data size, and storage address of the image file. The recording and reproducing processing unit 102b specifies the data size of each image file based on the file management information.

In step S9-6, the recording and reproducing processing unit 102b searches for a file recordable on the external recording medium D0 from those recorded on the HDD 106 based on the data size information and the specified recordable capacity information. That is, the recording and reproducing processing unit 102b compares the recordable capacity (free space size) of the external recording medium D0 with the data size of each image file in search for an oversize image file. If the data size of an image file exceeds the recordable capacity of the external recording medium D0, the recording and reproducing processing unit 102b specifies that the image file is "oversize". If the data size of an image file is less than or equal to the recordable capacity of the external recording medium D0, the recording and reproducing processing unit 102b specifies that the image file is not "oversize".

In step S9-7, the control unit 107b receives the search result information from the recording and reproducing processing unit 102b. The control unit 107b controls the display control unit 103b based on the search result of the recording and reproducing processing unit 102b. The display control unit 103b displays, on the display unit 104, a window 806 indicating the search result of the recording and reproducing processing unit 102b (see FIG. 17). The window 806 displays information 806o indicating if each image file is oversize, unlike in the window 206 shown in FIG. 8. Also, the window 806 displays representative images indicating the oversize image files, and those indicating non-oversize image files in different colors.

In this way, the oversize image files, and non-oversize image files can be easily distinguished from each other.

In step S9-9, the control unit 107b controls the display control unit 103b based on a representative image selection instruction.

Note that this embodiment does not allow the user to select oversize image files on the display window 806.

Figure 18:
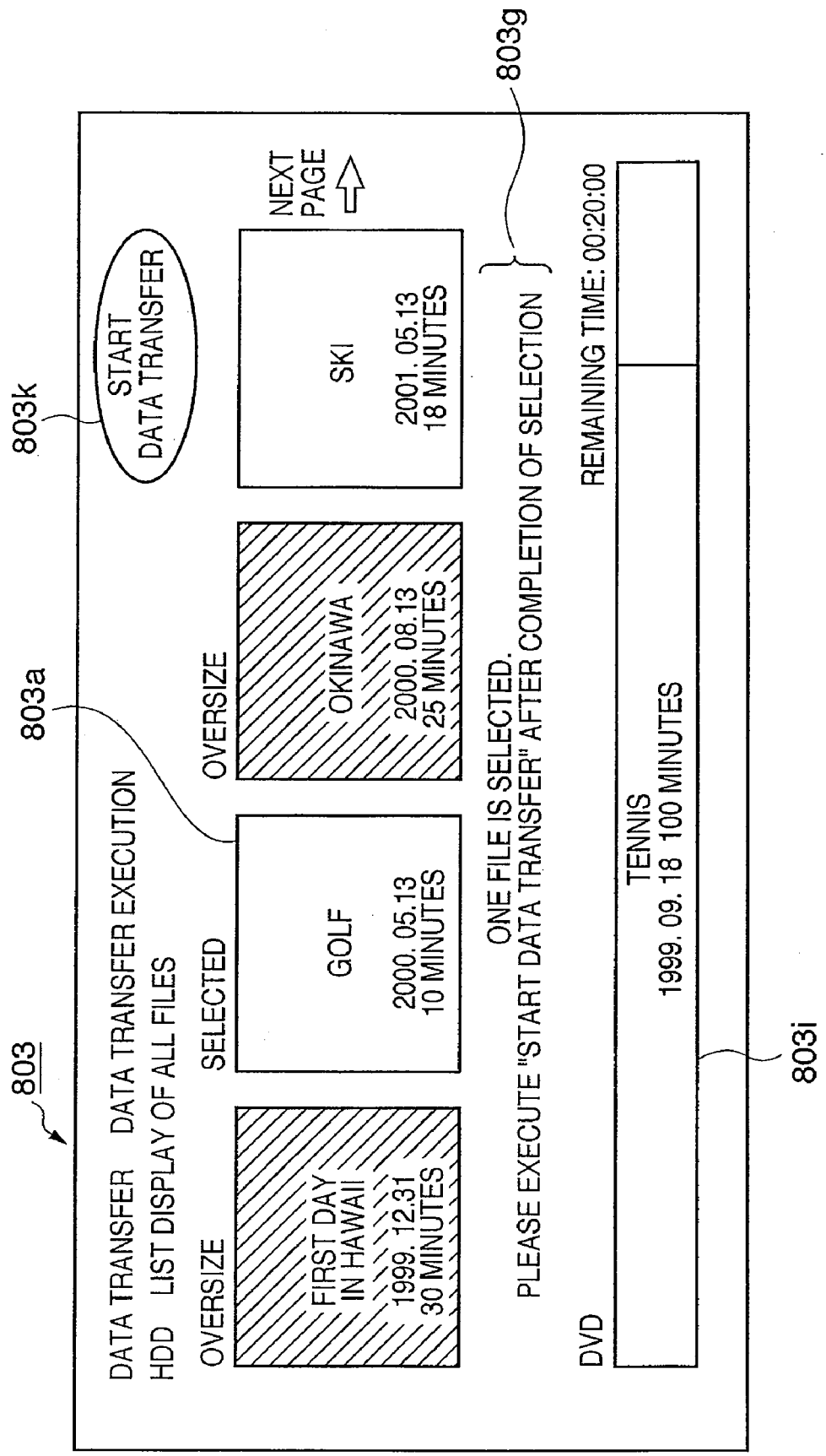
FIG. 18 shows an example of a window displayed on the display unit.
Figure 19:
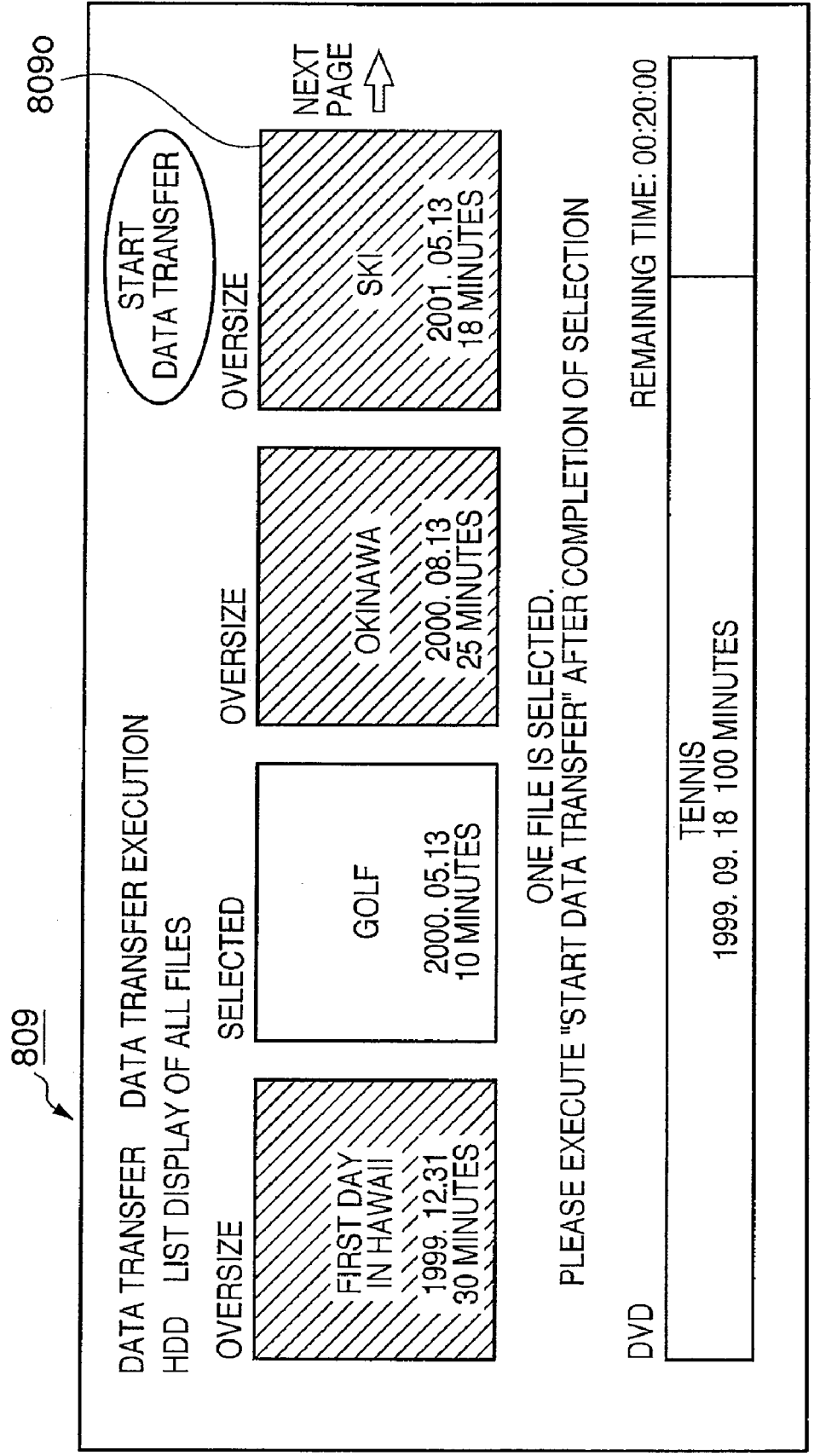
FIG. 19 shows an example of a window displayed on the display unit.

The display control unit 103b displays, on the display unit 104, a window 803 indicating the representative image selection instruction (see FIG. 18). The window 803 displays: a message 803g prompting the user to press a "start data transfer" button, a list display of all files recorded in the HDD 106, medium information 803i, and a "start data transfer" button 803k. The list display of all the files includes a representative image 803a having one-to-one correspondence with each file as in the window 201 shown in FIG. 3. The representative image indicated by the representative image selection instruction is, for example, highlighted to indicate its selection.

In step S9-10, the control unit 107b supplies the representative image selection instruction to the recording and reproducing processing unit 102b. The recording and reproducing processing unit 102b accesses the HDD 106 via the recording and reproducing unit 105b based on the representative image selection instruction. If the recording and reproducing processing unit 102b decides that no transfer file list is recorded in the HDD 106, it creates a new transfer file list; otherwise, it opens the existing transfer file list. The recording and reproducing processing unit 102b updates the transfer file list by additionally writing information (e.g., a file name) required to identify an image file corresponding to the representative image indicated by the representative image selection instruction in the transfer file list.

In step S9-11, the recording and reproducing processing unit 102b accesses the HDD 106 via the recording and reproducing unit 105b to acquire file management information recorded on the HDD 106. The recording and reproducing processing unit 102b specifies the data size of each image file based on the file management information.

The recording and reproducing processing unit 102b updates the recordable capacity (free space size) of the external recording medium D0 by subtracting the data size of the image file additionally written in the transfer file list in step S9-10 from the recordable capacity (free space size) of the external recording medium D0.

In step S9-12, the recording and reproducing processing unit 102b compares the newly specified recordable capacity (free space size) of the external recording medium D0 with the data size of each image file to search for an oversize image file. That is, if the data size of an image file exceeds the recordable capacity of the external recording medium D0, the recording and reproducing processing unit 102b specifies that the image file is "oversize". If the data size of an image file is less than or equal to the recordable capacity of the external recording medium D0, the recording and reproducing processing unit 102b specifies that the image file is not "oversize".

The display control unit 103b receives the search result in step S9-12 from the recording and reproducing processing unit 102b. The display control unit 103b displays, on the display unit 104, a window 809, which is obtained by updating the window 803 indicating the representative image selection instruction (see FIG. 18) based on the search result of the recording and reproducing processing unit 102b (see FIG. 19). For example, the window 809 displays updated information 809o indicating if each image file is oversize.

As described above, since oversize image files and non-oversize image files can be easily distinguished from each other, the load upon selecting non-oversize image files can be reduced. The labor required for a file search before data transfer can be reduced.

In this way, the operational load when transferring data to the external recording medium can be reduced.

As another embodiment, in the data transfer system, the video camera may incorporate a DVD drive in addition to the HDD. The idea of the present invention can be applied even when image files recorded on the internal HDD of the video camera are transferred to a DVD.

The medium title, which is determined by the recording and reproducing unit and is related to the medium information, may be recorded on at least one of the HDD 106 and external recording medium D0.

The data transfer system may comprise an HDD recorder which receives television broadcast data and records the received data on an HDD or the like, in place of the video camera. At this time, the system may detect a title of a program which is recorded using a known electronic program guide (EPG), and additionally records that title to an image file. In this way, the user can add the medium title at data transfer time without inputting any title.

In the data transfer system, the video camera may acquire information related to data transfer (medium management information) other than the scene title and free space size. In this case as well, by searching for image files related to the medium management information, image files having a high relevance can be transferred together to the external recording medium. In this manner, the operational load when transferring data to the external recording medium can be reduced.

Note that the present invention may be applied to either a system constituted by a plurality of devices (e.g., a host computer, interface device, reader, printer, and the like), or an apparatus consisting of a single device (e.g., a copying machine, facsimile apparatus, or the like).

A storage medium, which records program code of software that can implement the functions of the aforementioned embodiments, is supplied to the system or apparatus. Then, a computer (or a CPU or MPU) of the system or apparatus reads out and executes the program code stored in the storage medium, thereby achieving the objects of the present invention.

In this case, the program code itself read out from the storage medium implements the functions of the above-mentioned embodiments, and the storage medium which stores the program code constitutes the present invention.

As the storage medium used to supply the program code, for example, a floppy (Japanese registered trademark) disk, hard disk, optical disk, magneto-optical disk, CD-ROM, CD-R, magnetic tape, nonvolatile memory card, ROM, and the like can be used.

The functions of the aforementioned embodiments can be implemented when the computer executes the readout program code. The functions of the aforementioned embodiments can also be implemented by some or all of actual processing operations executed by an OS (operating system) or the like, which runs on the computer, based on instructions of the program code.

Furthermore, the program code read out from the storage medium is written in a memory equipped on a function expansion board or function expansion unit, which is inserted in or connected to the computer.

After that, a CPU or the like equipped on the function expansion board or unit executes some or all of actual processing operations based on instructions of the program code to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-333869, filed on Dec. 11, 2006 which is hereby incorporated by reference herein in its entirety.

What is claimed is:

1. A reproducing apparatus comprising:
a reproducing unit which reproduces image data from a first recording medium in which a plurality of image data each of which has a title are recorded;
an output unit which outputs, to a recording device, the image data reproduced from the first recording medium by the reproducing unit so that the image data recorded on the first recording medium is recorded on a second recording medium by the recording device;
a management information processing unit which generates management information representing identification information of the second recording medium and a title of the second recording medium, and stores the management information in a storage unit;
an obtaining unit which obtains the identification information of the second recording medium loaded in the recording device;
a searching unit which searches, in response to the second recording medium being loaded in the recording device, for image data having the title corresponding to the title of the second recording medium loaded in the recording medium among the plurality of image data recorded on the first recording medium on the basis of the identification information of the second recording medium obtained by the obtaining unit and the management information stored in the storage unit; and
a control unit which controls the reproducing unit and the output unit so that the reproducing unit reproduces the image data selected from the image data found by the searching unit and the output unit outputs the selected image data reproduced by the reproducing unit to the recording device in accordance with a recording instruction,
wherein the management information processing unit, if the management information representing the identification information of the second recording medium obtained by the obtaining unit is not stored in the storage unit, in response to the image data recorded on the first recording medium being recorded on the second recording medium by the recording device, determines the title of one of the image data recorded on the second recording medium by the recording device as the title of the second recording medium and generates the management information representing the determined title and the identification information of the second recording medium obtained by the obtaining unit.

2. The apparatus according to claim 1, further comprising:
a display unit which displays information of the image data found by the searching unit; and
a selecting unit which selects the image data to be recorded on the second recording medium from the image data displayed by the display unit.

3. The apparatus according to claim 2,
wherein the display unit displays the information of the plurality of image data each of which has a different title if the management information representing the identification information of the second recording medium obtained by the obtaining unit is not stored in the storage unit, and
wherein the control unit controls the reproducing unit and the output unit so that the reproducing unit reproduces the image data selected by the selecting unit from the plurality of the displayed image data having different titles and the output unit outputs the selected image data reproduced by the reproducing unit to the recording device.

4. The apparatus according to claim 2, wherein the display unit detects the title of the second recording medium loaded in the recording device on the basis of the identification information of the second recording medium obtained by the obtaining unit, and displays the title of the second recording medium with the information of the image data found by the searching unit.

5. The apparatus according to claim 1, wherein the obtaining unit receives the identification information of the second recording medium from the recording device.

* * * * *